United States Patent
Yajima et al.

(10) Patent No.: US 11,428,331 B2
(45) Date of Patent: Aug. 30, 2022

(54) SERVO VALVE

(71) Applicant: SMC CORPORATION, Tokyo (JP)

(72) Inventors: Hisashi Yajima, Tsukuba (JP); Masayuki Ishikawa, Toride (JP); Satoru Ito, Tsuchiura (JP); Gen Tsuchiya, Tsukubamirai (JP); Takehiko Kanazawa, Kashiwa (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/015,605

(22) Filed: Sep. 9, 2020

(65) Prior Publication Data

US 2021/0071766 A1    Mar. 11, 2021

(30) Foreign Application Priority Data

Sep. 9, 2019  (JP) ............................. JP2019-163580

(51) Int. Cl.
  *F16K 11/07*   (2006.01)
  *F16K 27/04*   (2006.01)
  *F16K 31/06*   (2006.01)

(52) U.S. Cl.
  CPC ............ *F16K 11/07* (2013.01); *F16K 27/041* (2013.01); *F16K 31/0613* (2013.01)

(58) Field of Classification Search
  CPC ...... F16K 11/07; F16K 11/0708; F16K 27/04; F16K 27/041; F16K 27/048; F15B 2211/30525; F15B 2211/3144; F15B 2211/327; F15B 13/0402; F15B 13/0442; F15B 13/02; F15B 13/021
  See application file for complete search history.

(56) References Cited

U.S. PATENT DOCUMENTS

| | | | | |
|---|---|---|---|---|
| 3,342,213 | A | * | 9/1967 | Walters ............... F15B 13/0435 137/625.69 |
| 4,923,172 | A | * | 5/1990 | Wood .................. F16K 11/0708 251/282 |
| 5,617,895 | A | * | 4/1997 | Pfuhl .................. F15B 13/0402 137/625.69 |
| 2003/0131896 | A1 | | 7/2003 | Yajima et al. |
| 2011/0067771 | A1 | * | 3/2011 | Navale ................ F16K 11/0708 137/625.25 |
| 2017/0292541 | A1 | * | 10/2017 | Miyazoe ................. F16K 27/00 |
| 2018/0135766 | A1 | * | 5/2018 | Miyazoe ............... F16K 27/003 |
| 2019/0376613 | A1 | * | 12/2019 | Hoefling ............ F15B 13/0442 |
| 2020/0208745 | A1 | * | 7/2020 | Hirose ................ F16K 37/0033 |

FOREIGN PATENT DOCUMENTS

JP    2003-206908 A    7/2003

* cited by examiner

*Primary Examiner* — Kelsey E Cary
(74) *Attorney, Agent, or Firm* — Oblon, McClelland, Maier & Neustadt, L.L.P.

(57) ABSTRACT

A first flow path area at a position where one of multiple openings of a sleeve and one of multiple grooves of a spool overlap with each other is different in size from a second flow path area at a position where another one of the openings of the sleeve and another one of the grooves of the spool overlap with each other. The one opening and the one groove form a flow path for connecting one of one pressure chamber and the other pressure chamber to a fluid supply source, due to displacement of the spool. The other opening and the other groove form a flow path for connecting another one of the other pressure chamber and the one pressure chamber to a fluid discharge port, due to the displacement of the spool.

14 Claims, 19 Drawing Sheets

SERVO VALVE

CROSS-REFERENCE TO RELATED APPLICATION

This application is based upon and claims the benefit of priority from Japanese Patent Application No. 2019-163580 filed on Sep. 9, 2019, the contents all of which are incorporated herein by reference.

BACKGROUND OF THE INVENTION

Field of the Invention

The present invention relates to a servo valve that controls the flow rate of a fluid supplied to or discharged from two pressure chambers of a fluid pressure cylinder.

Description of the Related Art

For example, a servo valve that controls an operational position of a spool using a moving-magnet-type electromagnetic actuator as a driving source so as to control the flow rate of air supplied to an air cylinder has conventionally been known (for example, Japanese Laid-Open Patent Publication No. 2003-206908).

On the other hand, there has been known a technique in which meter-out control or meter-in control is performed with a speed controller (variable throttle valve) being provided to the air cylinder or a pipe (or tube) connected to the air cylinder. The meter-out control is control in which the flow rate of the air discharged from a pressure chamber of the air cylinder is reduced. The meter-in control is control in which the flow rate of the air supplied to the pressure chamber of the air cylinder is reduced. The meter-out control is performed in a case that operation needs to be stabilized against external disturbance or in a case that thrust force needs to rise quickly after a stroke end has been reached. The meter-in control is performed in a case that "jumping-out phenomenon" in which the cylinder starts to move swiftly needs to be suppressed or in a case that thrust force needs to rise gradually after the stroke end has been reached.

SUMMARY OF THE INVENTION

In the air cylinder controlled by the servo valve, if the meter-out control or the meter-in control is performed, it is necessary to provide the speed controller to the air cylinder or the pipe (or tube) additionally.

The present invention has been made in view of the above circumstances, and an object thereof is to provide a servo valve including a unique structure that achieves meter-out control or meter-in control.

According to an aspect of the present invention, there is provided a servo valve configured to control a flow rate of a fluid supplied to and discharged from one pressure chamber and the other pressure chamber of a fluid pressure cylinder, and the servo valve includes a sleeve including a plurality of openings and a spool that is provided inside the sleeve, wherein the spool includes a plurality of lands and a plurality of grooves. In addition, a first flow path area at a position where one opening of the openings and one groove of the grooves overlap with each other is different in size from a second flow path area at a position where another opening of the openings and another groove of the grooves overlap with each other. The one opening and the one groove form a flow path for connecting one of the one pressure chamber and the other pressure chamber to a fluid supply source, due to displacement of the spool. The other opening and the other groove form a flow path for connecting another one of the other pressure chamber and the one pressure chamber to a fluid discharge port, due to the displacement of the spool.

According to the servo valve described above, meter-out control or meter-in control can be achieved by the structure of the servo valve itself without a speed controller attached to the fluid pressure cylinder.

In the servo valve according to the present invention, when the spool is displaced, the first flow path area at the place where a predetermined opening of the sleeve and a predetermined groove of the spool overlap with each other is different in size from the second flow path area at the place where another predetermined opening of the sleeve and another predetermined groove of the spool overlap with each other. Thus, the meter-out control or the meter-in control can be achieved by the structure of the servo valve itself.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a servo valve according to the present invention are hereinafter described with reference to the attached drawings.

First Embodiment

A servo valve 10 according to a first embodiment of the present invention is described with reference to FIG. 1 to FIG. 9.

Figure 1:
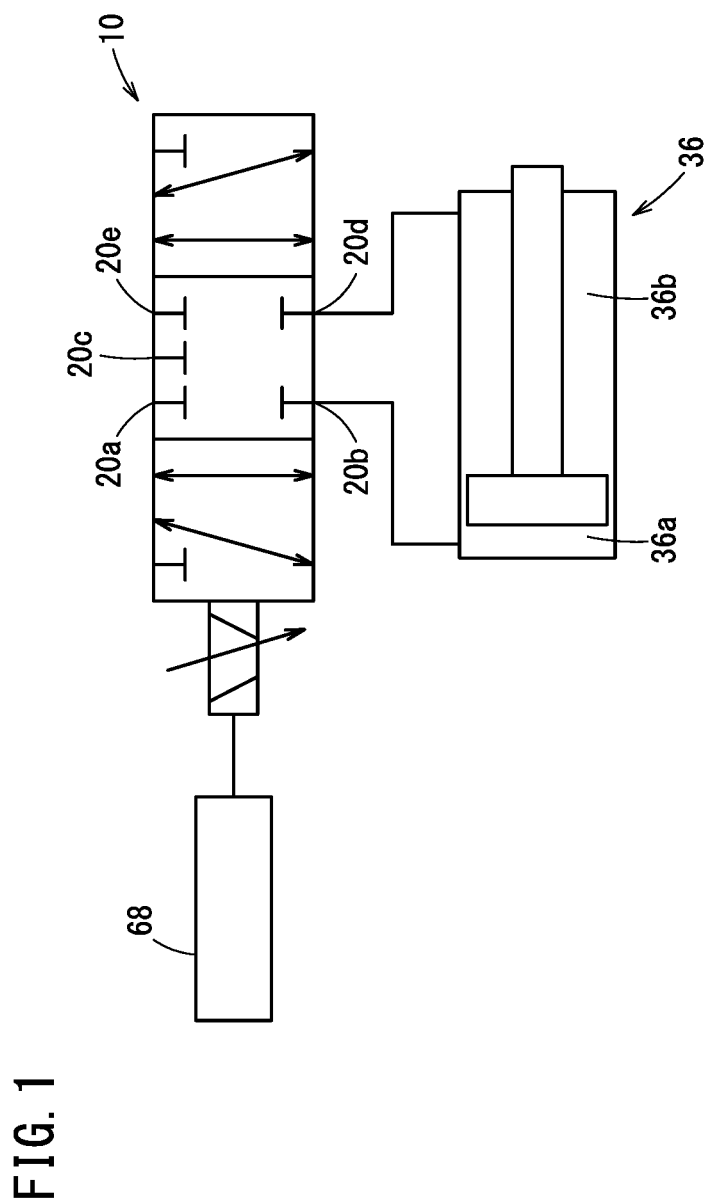
FIG. 1 is an overall view of a system including a servo valve according to the present invention.

FIG. 1 is a schematic diagram illustrating an entire system that controls a fluid pressure cylinder 36 by the servo valve 10. The servo valve 10 is a valve that controls the flow rate of a fluid supplied to or discharged from one pressure chamber 36a and the other pressure chamber 36b of the fluid pressure cylinder 36. The operation of the servo valve 10 is controlled by a valve controller 68. Here, the term "fluid" means a compressible fluid including air. For the convenience of description, in FIG. 1, the servo valve 10 is expressed using general circuit symbols.

Figure 2:
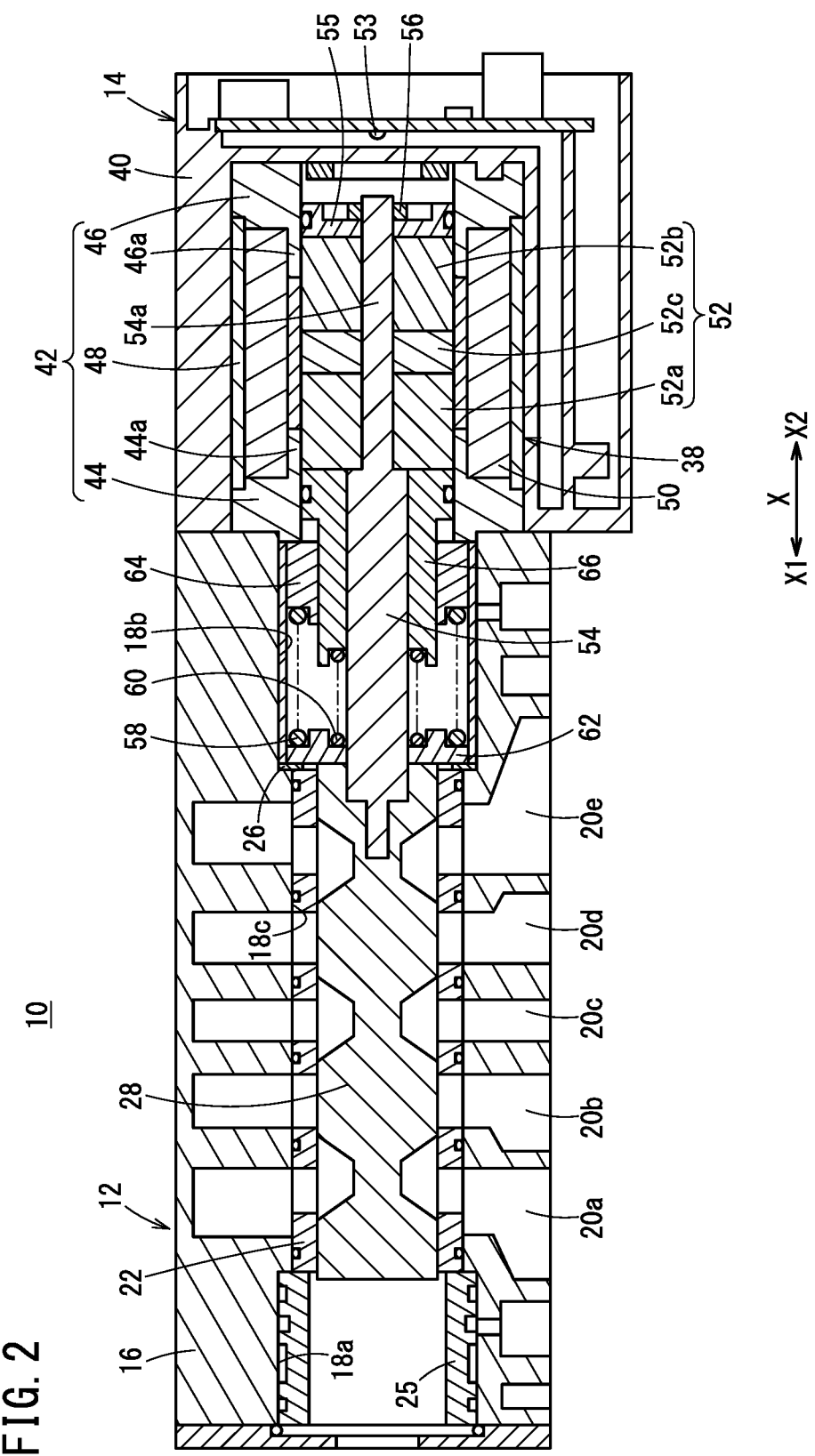
FIG. 2 is a cross-sectional view of a servo valve according to a first embodiment of the present invention.

As illustrated in FIG. 2, the servo valve 10 includes a flow path switching mechanism unit 12 and an actuator unit 14. The flow path switching mechanism unit 12 includes a tubular-shaped valve body 16 and a spool 28 that is disposed in the valve body 16. The actuator unit 14 includes a stator part 38 that is disposed on an end of the valve body 16, and a magnet part 52 that is connected to an end of the spool 28 through a connection shaft 54. In the description below, a direction that is parallel to an axis direction of the spool 28, that is, a direction in which the spool 28 moves is referred to as an X direction. Moreover, a direction in which the spool 28 is separated from the actuator unit 14 along the X direction is referred to as an X1 direction, and a direction in which the spool 28 comes close to the actuator unit 14 along the X direction is referred to as an X2 direction.

The valve body 16 includes a hole that penetrates the valve body 16 in a longitudinal direction thereof. This hole is made up of a first large-diameter hole 18a that is formed at an end of the valve body 16 in the X1 direction, a second large-diameter hole 18b that is formed at an end of the valve body 16 in the X2 direction, and a small-diameter hole 18c that is formed between the first large-diameter hole 18a and the second large-diameter hole 18b.

The valve body 16 is provided with a first port 20a to a fifth port 20e that communicate with the small-diameter hole 18c and are open at an outer peripheral surface of the valve body 16. The first to fifth ports 20a to 20e are arranged in the X direction. The first port 20a and the fifth port 20e are connected to a fluid supply source (not shown), and the third port 20c is connected to a fluid discharge port (not shown). In addition, the second port 20b and the fourth port 20d are connected to the one pressure chamber 36a and the other pressure chamber 36b of the fluid pressure cylinder 36, respectively (see FIG. 1).

A sleeve 22 with a cylindrical shape is inserted into the small-diameter hole 18c of the valve body 16. The sleeve 22 is positioned and fixed in the valve body 16 in the axis direction using a tubular-shaped sleeve stopper 25 that is fixed to the first large-diameter hole 18a of the valve body 16 and a snap ring 26 that is fixed to an end of the second large-diameter hole 18b of the valve body 16 in the X1 direction.

Figure 3:
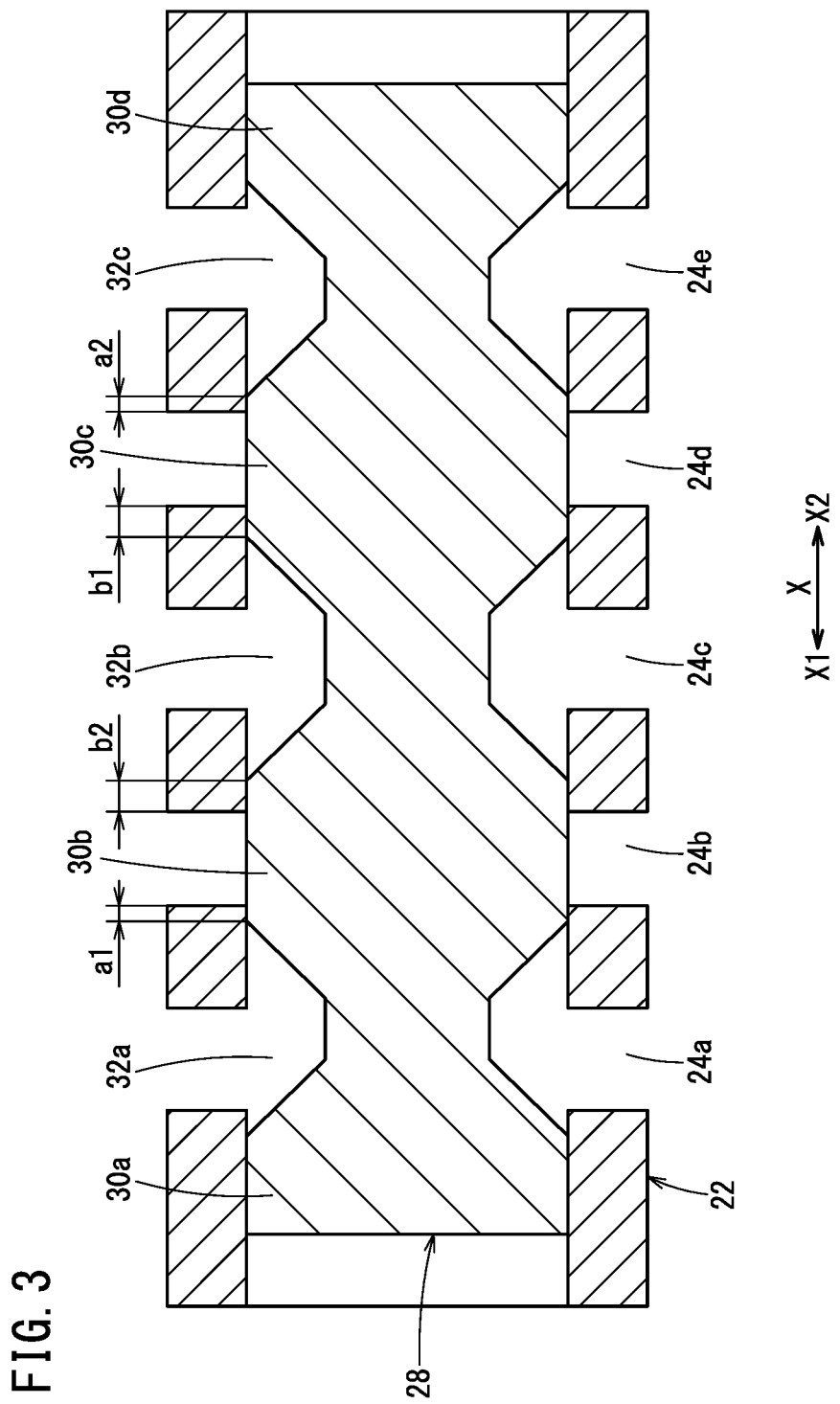
FIG. 3 is a schematic diagram illustrating a relation between a sleeve and a spool of the servo valve in FIG. 2 when the spool is at a neutral position.

As illustrated in FIG. 3, the sleeve 22 includes a first opening 24a, a second opening 24b, a third opening 24c, a fourth opening 24d, and a fifth opening 24e. Each of the first opening 24a to the fifth opening 24e includes a pair of openings that penetrates a wall surface of the sleeve 22 on both sides in a diameter direction. The first opening 24a to the fifth opening 24e communicate with the first port 20a to the fifth port 20e of the valve body 16, respectively. The shape of the first opening 24a to the fifth opening 24e when viewed in a radial direction is the same rectangular shape, and the width thereof (length that is orthogonal to the X direction) is constant in the X direction. In the present embodiment, the shape of the first opening 24a to the fifth opening 24e is the rectangular shape; however, the shape thereof may be a circular shape including an oval or elliptical shape.

The cylindrical spool 28 is inserted into the sleeve 22 so as to be movable in the X direction. The spool 28 is provided with a first land 30a, a second land 30b, a third land 30c, and a fourth land 30d that are in close contact with an inner peripheral surface of the sleeve 22. The first land 30a to the fourth land 30d are arranged in the X direction. A first groove 32a is formed between the first land 30a and the second land 30b so as to surround an outer peripheral surface of the spool. Similarly, between the second land 30b and the third land 30c, a second groove 32b is formed so as to surround the outer peripheral surface, and between the third land 30c and the fourth land 30d, a third groove 32c is formed so as to surround the outer peripheral surface.

As illustrated in FIG. 3, when the actuator unit 14 is not energized and the spool 28 is at a neutral position, the second opening 24b of the sleeve 22 is closed by the second land 30b of the spool 28, and the fourth opening 24d of the sleeve 22 is closed by the third land 30c of the spool 28. Thus, the second opening 24b connected to the one pressure chamber 36a of the fluid pressure cylinder 36 is blocked from the first opening 24a connected to the fluid supply source and is also blocked from the third opening 24c connected to the fluid discharge port. In addition, the fourth opening 24d connected to the other pressure chamber 36b of the fluid pressure cylinder 36 is blocked from the fifth opening 24e connected to the fluid supply source and is also blocked from the third opening 24c connected to the fluid discharge port.

When the spool 28 is at the neutral position, an X-direction length (lap length) a1 is less than an X-direction length (lap length) b1. The X-direction length a1 is a length, in the X direction, of a portion where the second land 30*b* is in contact with an inner wall surface of the sleeve 22 between the first opening 24*a* and the second opening 24*b*. The X-direction length b1 is a length, in the X direction, of a portion where the third land 30*c* is in contact with an inner wall surface of the sleeve 22 between the third opening 24*c* and the fourth opening 24*d*. In addition, when the spool 28 is at the neutral position, an X-direction length (lap length) a2 is less than an X-direction length (lap length) b2. The X-direction length a2 is a length, in the X direction, of a portion where the third land 30*c* is in contact with an inner wall surface of the sleeve 22 between the fourth opening 24*d* and the fifth opening 24*e*. The X-direction length b2 is a length, in the X direction, of a portion where the second land 30*b* is in contact with an inner wall surface of the sleeve 22 between the second opening 24*b* and the third opening 24*c*. In the present embodiment, the length a2 is equal to the length a1, and the length b2 is equal to the length b1.

The stator part 38 is housed in a stator housing 40 that is fixed to the end of the valve body 16 in the X2 direction. The stator part 38 includes a fixed yoke 42 that is made from a ferromagnetic body and an exciting coil 50 that is disposed inside the fixed yoke 42. The fixed yoke 42 includes a thick-walled-tubular-shaped first end yoke 44 that is disposed on the side of the X1 direction, a thick-walled-tubular-shaped second end yoke 46 that is disposed on the side of the X2 direction, and a thin-walled-tubular-shaped outer yoke 48 that is disposed between the first end yoke 44 and the second end yoke 46 so as to be flush with outer peripheral surfaces of the first end yoke 44 and the second end yoke 46.

The first end yoke 44 has, on an inner peripheral side thereof, a first pole tooth 44*a* that is formed protruding so as to extend toward the second end yoke 46. The second end yoke 46 has, on an inner peripheral side thereof, a second pole tooth 46*a* that is formed protruding so as to extend toward the first end yoke 44. When electric current is applied to the exciting coil 50 in a predetermined direction, the first pole tooth 44*a* becomes the north pole (N-pole) and the second pole tooth 46*a* becomes the south pole (S-pole). When electric current is applied to the exciting coil 50 in the opposite direction, the first pole tooth 44*a* becomes S-pole and the second pole tooth 46*a* becomes N-pole.

A magnet part 52 includes a first magnet 52*a*, a second magnet 52*b*, and a tubular inner yoke 52*c* made of a ferromagnetic body. The first magnet 52*a* and the second magnet 52*b* are permanent magnets with a tubular shape. The inner yoke 52*c* is disposed between the first magnet 52*a* and the second magnet 52*b*. An outer peripheral surface of the first magnet 52*a* faces an inner peripheral surface of the first pole tooth 44*a* of the first end yoke 44, and an outer peripheral surface of the second magnet 52*b* faces an inner peripheral surface of the second pole tooth 46*a* of the second end yoke 46. The first magnet 52*a* is magnetized so that the X1 direction side thereof becomes N-pole and the X2 direction side becomes S-pole. The second magnet 52*b* is magnetized so that the X1 direction side becomes S-pole and the X2 direction side becomes N-pole.

One end of the connection shaft 54 is fixed to the spool 28, and the magnet part 52 is fixed to the other end of the connection shaft 54. Specifically, a small-diameter shaft portion 54*a* is formed at the other end of the connection shaft 54 through a step portion. This small-diameter shaft portion 54*a* is inserted into the magnet part 52 and is further inserted into a magnet stopper 55, and then an end of the small-diameter shaft portion 54*a* is screw-engaged with a nut 56, whereby the magnet part is fixed. Thus, the spool 28 can be displaced in the X direction together with the magnet part 52.

In the second large-diameter hole 18*b* of the valve body 16 on the outer peripheral side of the connection shaft 54, a first coil spring 58 and a second coil spring 60 are disposed. The first coil spring 58 is placed between a common spring receiver 62 and a first spring receiver 64. The common spring receiver 62 is in contact with the end of the spool 28 in the X2 direction and can move with the spool 28. The first spring receiver 64 is in contact with an end of the first end yoke 44 in the X1 direction. The second coil spring 60 is disposed inside the first coil spring 58 and placed between the common spring receiver 62 and a second spring receiver 66. The second spring receiver 66 is fixed on the outer periphery of the connection shaft 54.

When the spool 28 is displaced in the X2 direction from the neutral position, the first coil spring 58 is compressed in the X direction and applies biasing force in the X1 direction to the spool 28. When the spool 28 is displaced in the X1 direction from the neutral position, the second coil spring 60 is compressed in the X direction and applies biasing force in the X2 direction to the spool 28. That is to say, when energization to the exciting coil 50 is stopped, the first coil spring 58 and the second coil spring 60 return the spool 28 to the neutral position, and when the exciting coil 50 is not energized, the first coil spring 58 and the second coil spring 60 keep the spool 28 at the neutral position stably.

The stator housing 40 is provided with a magnetic sensor 53 capable of detecting magnetic flux that changes in accordance with the displacement of the magnet part 52 in the X direction. This magnetic sensor 53 can detect the position of the spool 28 that is displaced together with the magnet part 52.

The servo valve 10 according to the present embodiment is basically structured as described above, and the operation thereof is hereinafter described. Note that in an initial state, the spool 28 is at a neutral position as illustrated in FIG. 3.

In the initial state, the second opening 24*b* of the sleeve 22 is closed by the second land 30*b* of the spool 28, and the fourth opening 24*d* of the sleeve 22 is closed by the third land 30*c* of the spool 28. Thus, the fluid is not supplied to or discharged from the one pressure chamber 36*a* and the other pressure chamber 36*b* of the fluid pressure cylinder 36.

In the initial state, when the exciting coil 50 is energized so that the current flows into the exciting coil 50 in the predetermined direction, the first pole tooth 44*a* of the first end yoke 44 becomes N-pole and the second pole tooth 46*a* of the second end yoke 46 becomes S-pole. Then, the spool 28 that is integral with the magnet part 52 is displaced in the X1 direction due to an interaction between the magnetic flux that occurs in the first end yoke 44 and the magnetic flux of the first magnet 52*a* and an interaction between the magnetic flux that occurs in the second end yoke 46 and the magnetic flux of the second magnet 52*b*.

As the spool 28 is displaced in the X1 direction, the following occurs. First, when the displaced amount of the spool 28 reaches a2, the closed state of the fourth opening 24*d* of the sleeve 22 by the third land 30*c* of the spool 28 is canceled and the fourth opening 24*d* of the sleeve 22 starts to overlap with the third groove 32*c* of the spool 28. Next, when the displaced amount of the spool 28 reaches b2, the closed state of the second opening 24*b* of the sleeve 22 by the second land 30*b* of the spool 28 is canceled and the second opening 24*b* of the sleeve 22 starts to overlap with the second groove 32*b* of the spool 28.

When the fourth opening 24d of the sleeve 22 overlaps with the third groove 32c of the spool 28, the fourth port 20d connected to the other pressure chamber 36b of the fluid pressure cylinder 36 communicates with the fifth port 20e connected to the fluid supply source. In addition, when the second opening 24b of the sleeve 22 overlaps with the second groove 32b of the spool 28, the second port 20b connected to the one pressure chamber 36a of the fluid pressure cylinder 36 communicates with the third port 20c connected to the fluid discharge port.

Figure 4:
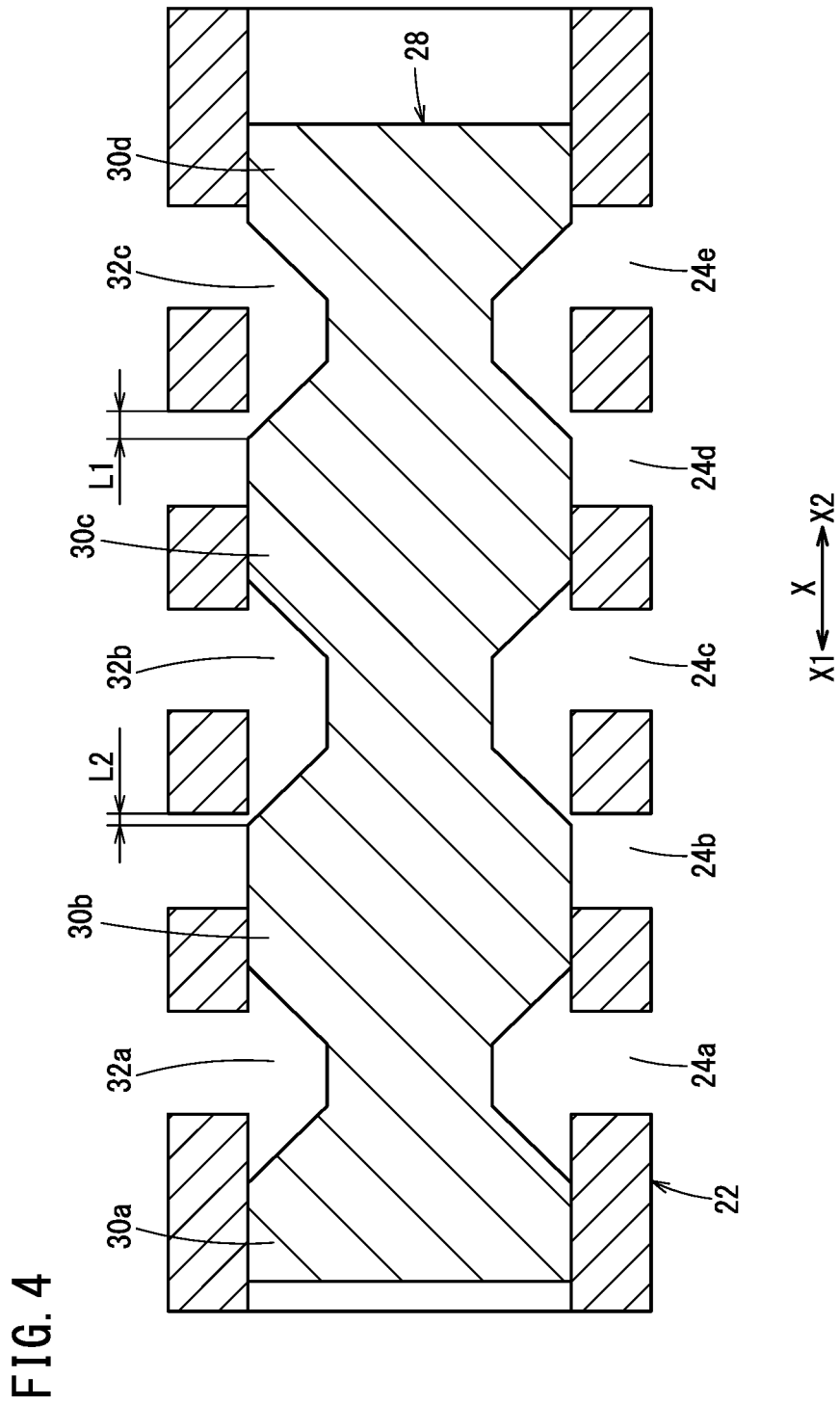
FIG. 4 is a diagram corresponding to FIG. 3 when the spool in FIG. 2 has been displaced in an X1 direction by a predetermined amount.

As illustrated in FIG. 4, when the spool 28 has been displaced in the X1 direction by a predetermined amount, the fourth opening 24d overlaps with the third groove 32c by a length L1 in the X direction, and the second opening 24b overlaps with the second groove 32b by a length L2 in the X direction.

At the neutral position, the lap length a2 is less than the lap length b2, wherein the lap length a2 is a length, in the X direction, of a portion where the third land 30c is in contact with an inner wall surface of the sleeve 22 between the fourth opening 24d and the fifth opening 24e, and the lap length b2 is a length, in the X direction, of a portion where the second land 30b is in contact with an inner wall surface of the sleeve 22 between the second opening 24b and the third opening 24c. Thus, the length L2 is less than the length L1 by (b2−a2). Therefore, the effective area of a flow path from the one pressure chamber 36a to the fluid discharge port is smaller than the effective area of a flow path from the fluid supply source to the other pressure chamber 36b. As a result, when the fluid is supplied to the other pressure chamber 36b and the fluid is discharged from the one pressure chamber 36a, meter-out control that reduces the flow rate of the discharged fluid is performed. Note that the term "effective area of flow path" is a cross-section area at the smallest portion in the flow path.

Figure 5:
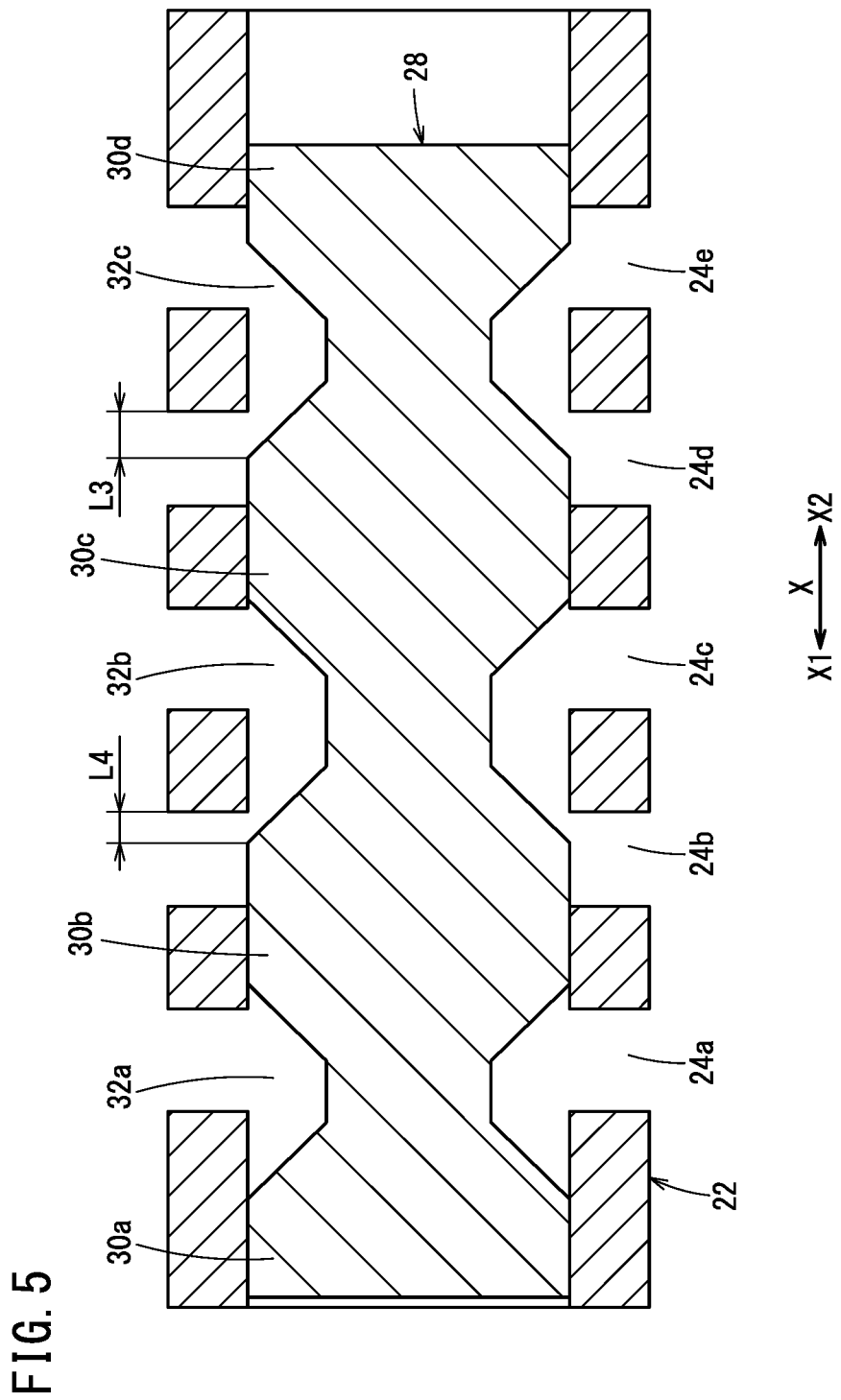
FIG. 5 is a diagram corresponding to FIG. 3 when the spool in FIG. 2 has been further displaced in the X1 direction by the predetermined amount than in the case of FIG. 4.

As illustrated in FIG. 5, when the spool 28 has been further displaced in the X1 direction by the predetermined amount, the fourth opening 24d overlaps with the third groove 32c in the X direction by a length L3 that is greater than the length L1, and the second opening 24b overlaps with the second groove 32b in the X direction by a length L4 that is greater than the length L2. Since the length L4 is less than the length L3, the meter-out control is performed.

Since the length L3 is greater than the length L1, the flow rate of the fluid supplied to the other pressure chamber 36b is large compared with the case in FIG. 4. Moreover, since the length L4 is greater than the length L2, the flow rate of the fluid discharged from the one pressure chamber 36a is also large compared with the case in FIG. 4. Thus, the operation speed of the fluid pressure cylinder 36 is high.

Next, after the energization to the exciting coil 50 is stopped so that the spool 28 is returned to the neutral position, when the exciting coil 50 is energized again so that the current flows into the exciting coil 50 in an opposite direction of the predetermined direction, the first pole tooth 44a of the first end yoke 44 becomes S-pole and the second pole tooth 46a of the second end yoke 46 becomes N-pole. Then, the spool 28 that is integral with the magnet part 52 is displaced in the X2 direction due to the interaction between the magnetic flux that occurs in the first end yoke 44 and the magnetic flux of the first magnet 52a and the interaction between the magnetic flux that occurs in the second end yoke 46 and the magnetic flux of the second magnet 52b.

As the spool 28 is displaced in the X2 direction, the following occurs. First, when the displaced amount of the spool 28 reaches a1, the closed state of the second opening 24b of the sleeve 22 by the second land 30b of the spool 28 is canceled and the second opening 24b of the sleeve 22 starts to overlap with the first groove 32a of the spool 28. Next, when the displaced amount of the spool 28 reaches b1, the closed state of the fourth opening 24d of the sleeve 22 by the third land 30c of the spool 28 is canceled and the fourth opening 24d of the sleeve 22 starts to overlap with the second groove 32b of the spool 28.

When the second opening 24b of the sleeve 22 overlaps with the first groove 32a of the spool 28, the second port 20b connected to the one pressure chamber 36a of the fluid pressure cylinder 36 communicates with the first port 20a connected to the fluid supply source. In addition, when the fourth opening 24d of the sleeve 22 overlaps with the second groove 32b of the spool 28, the fourth port 20d connected to the other pressure chamber 36b of the fluid pressure cylinder 36 communicates with the third port 20c connected to the fluid discharge port.

Figure 6:
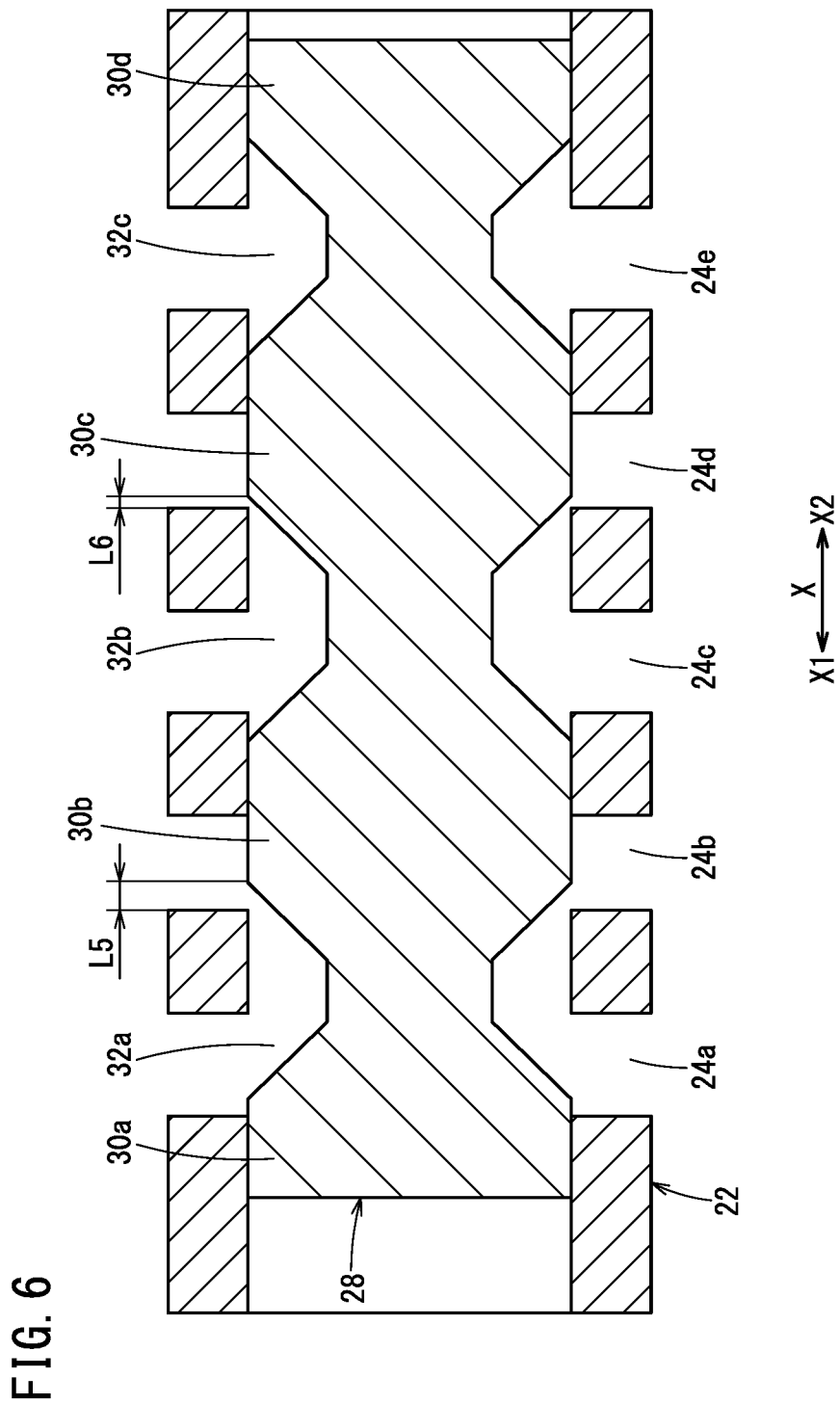
FIG. 6 is a diagram corresponding to FIG. 3 when the spool in FIG. 2 has been displaced in an X2 direction by the predetermined amount.

As illustrated in FIG. 6, when the spool 28 has been displaced in the X2 direction by the predetermined amount, the second opening 24b overlaps with the first groove 32a by a length L5 in the X direction and the fourth opening 24d overlaps with the second groove 32b by a length L6 in the X direction.

At the neutral position, the lap length a1 is less than the lap length b1. The lap length a1 is a length, in the X direction, of a portion where the second land 30b is in contact with an inner wall surface of the sleeve 22 between the first opening 24a and the second opening 24b. The lap length b1 is a length, in the X direction, of a portion where the third land 30c is in contact with an inner wall surface of the sleeve 22 between the third opening 24c and the fourth opening 24d. Thus, the length L6 is less than the length L5 by (b1−a1). Therefore, the effective area of the flow path from the other pressure chamber 36b to the fluid discharge port is smaller than the effective area of the flow path from the fluid supply source to the one pressure chamber 36a. As a result, when the fluid is supplied to the one pressure chamber 36a and the fluid is discharged from the other pressure chamber 36b, the meter-out control that reduces the flow rate of the discharged fluid is performed.

Figure 7:
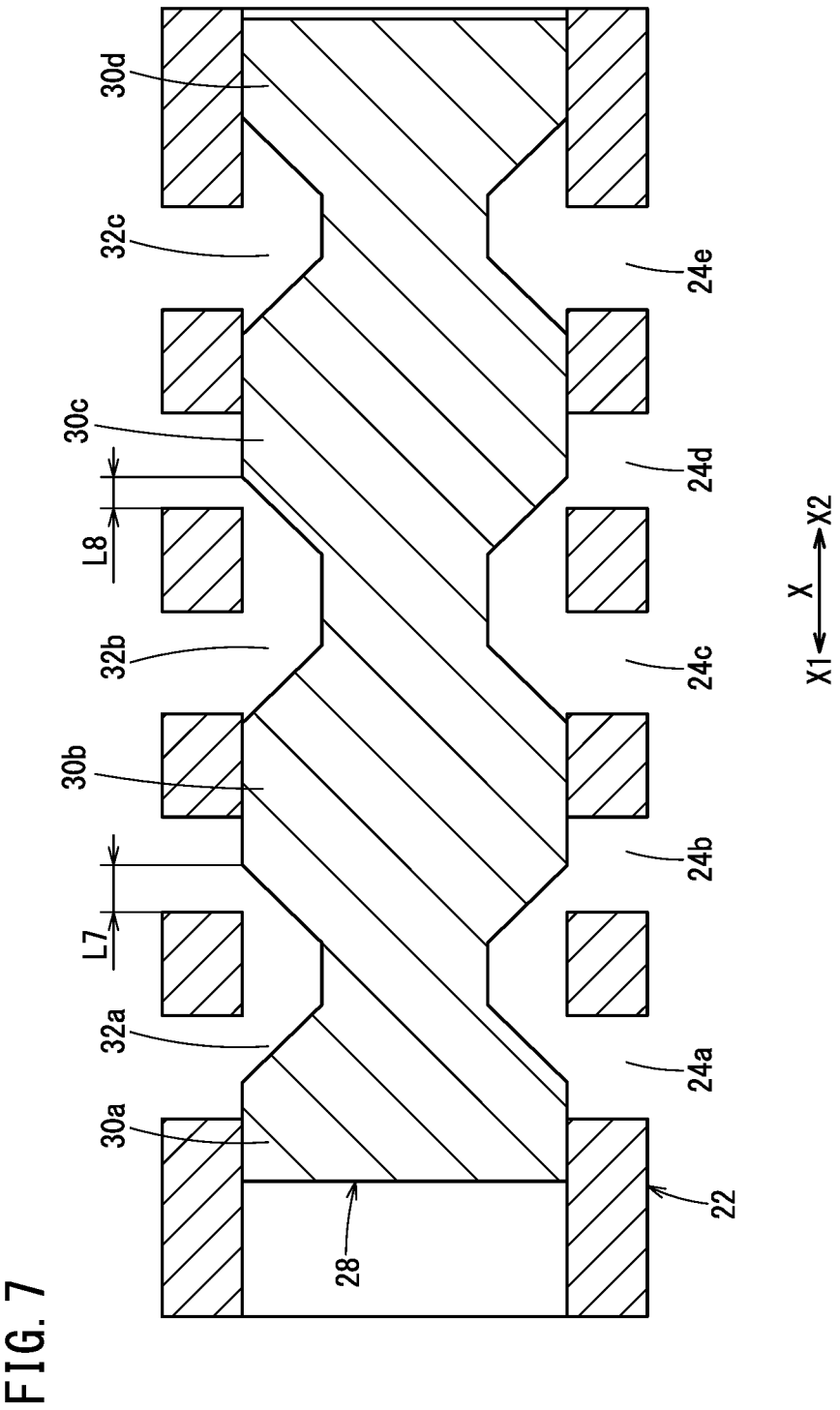
FIG. 7 is a diagram corresponding to FIG. 3 when the spool in FIG. 2 has been further displaced in the X2 direction by the predetermined amount than in the case of FIG. 6.

As illustrated in FIG. 7, when the spool 28 has been further displaced in the X2 direction by the predetermined amount, the second opening 24b overlaps with the first groove 32a in the X direction by a length L7 that is greater than the length L5 and the fourth opening 24d overlaps with the second groove 32b in the X direction by a length L8 that is greater than the length L6. Since the length L8 is less than the length L7, the meter-out control is performed.

Since the length L7 is greater than the length L5, the flow rate of the fluid supplied to the one pressure chamber 36a is large compared with the case in FIG. 6. Moreover, since the length L8 is greater than the length L6, the flow rate of the fluid discharged from the other pressure chamber 36b is also large compared with the case in FIG. 6. Thus, the operation speed of the fluid pressure cylinder 36 is high.

Figure 8:
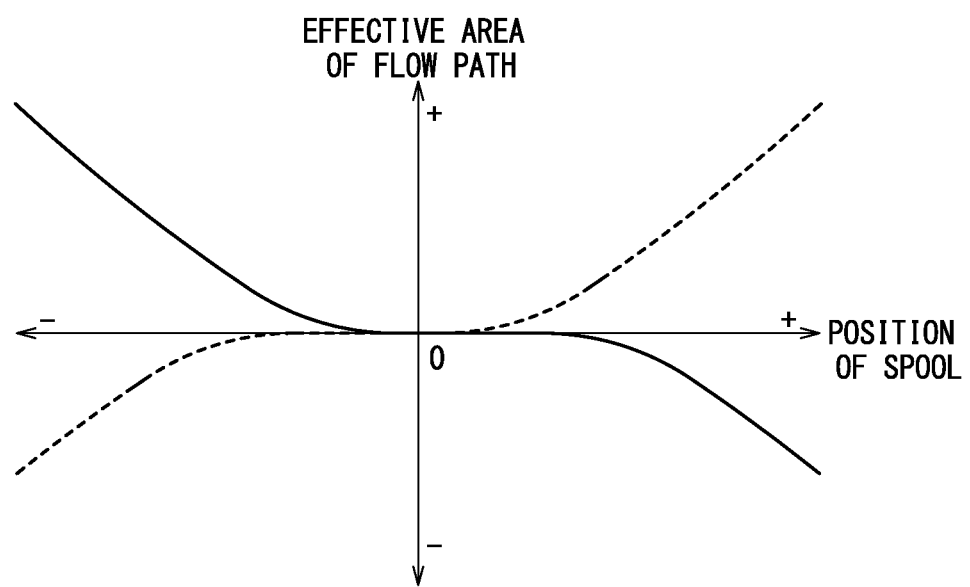
FIG. 8 is a diagram showing a relation between a position of the spool of the servo valve in FIG. 2 and the effective area of a flow path in a case where meter-out control is performed.

FIG. 8 shows a relation between the position of the spool 28 and the effective area of the flow path including the second port 20b and a relation between the position of the spool 28 and the effective area of the flow path including the fourth port 20d in the case where the above meter-out control is performed. A horizontal axis represents the position of the spool 28, and the origin is the point when the spool 28 is at the neutral position. The displaced amount of the spool 28 in the X1 direction is expressed by a negative value, and the displaced amount of the spool 28 in the X2 direction is expressed by a positive value. A vertical axis shows the effective area of the flow path. The effective area of the flow path when the fluid is supplied to the one pressure chamber 36a or the other pressure chamber 36b is expressed by a positive value, and the effective area of the flow path when the fluid is discharged from the other pressure chamber 36b or the one pressure chamber 36a is expressed by a negative value.

The relation between the position of the spool 28 and the effective area of the flow path including the second port 20b is shown by a solid line, and the relation between the position of the spool 28 and the effective area of the flow path including the fourth port 20d is shown by a dashed line. As can be understood from FIG. 8, when the spool 28 has been displaced from the neutral position in the X1 direction by the predetermined amount or more, the effective area of the flow path where the fluid in the other pressure chamber 36b is discharged through the fourth port 20d is smaller than the effective area of the flow path where the fluid is supplied to the one pressure chamber 36a through the second port 20b. Moreover, when the spool 28 has been displaced from the neutral position in the X2 direction by the predetermined amount or more, the effective area of the flow path where the fluid in the one pressure chamber 36a is discharged through the second port 20b is smaller than the effective area of the flow path where the fluid is supplied to the other pressure chamber 36b through the fourth port 20d.

Here, the maximum displaced amount of the spool 28 in the X1 direction is set within a range in which a flow path area where the fourth opening 24d overlaps with the third groove 32c does not exceed the flow path area where the fifth opening 24e overlaps with the third groove 32c, for example. Similarly, the maximum displaced amount of the spool 28 in the X2 direction is set within a range in which the flow path area where the second opening 24b overlaps with the first groove 32a does not exceed the flow path area where the first opening 24a overlaps with the first groove 32a, for example.

In the present embodiment, when the spool 28 is at the neutral position, a magnitude relation is set so that the lap length a1 is less than the lap length b1 and the lap length a2 is less than the lap length b2. On the other hand, when meter-in control is to be performed, it is only necessary to set this magnitude relation in reverse. That is to say, when the spool 28 is at the neutral position, if the magnitude relation is set so that the lap length a1 is greater than the lap length b1 and the lap length a2 is greater than the lap length b2, the meter-in control can be performed.

Moreover, in the present embodiment, the fluid supply source is connected to the first port 20a and the fifth port 20e and the fluid discharge port is connected to the third port 20c. However, if the fluid supply source is connected to the third port 20c and the fluid discharge port is connected to the first port 20a and the fifth port 20e, the meter-in control can be performed.

Figure 9:
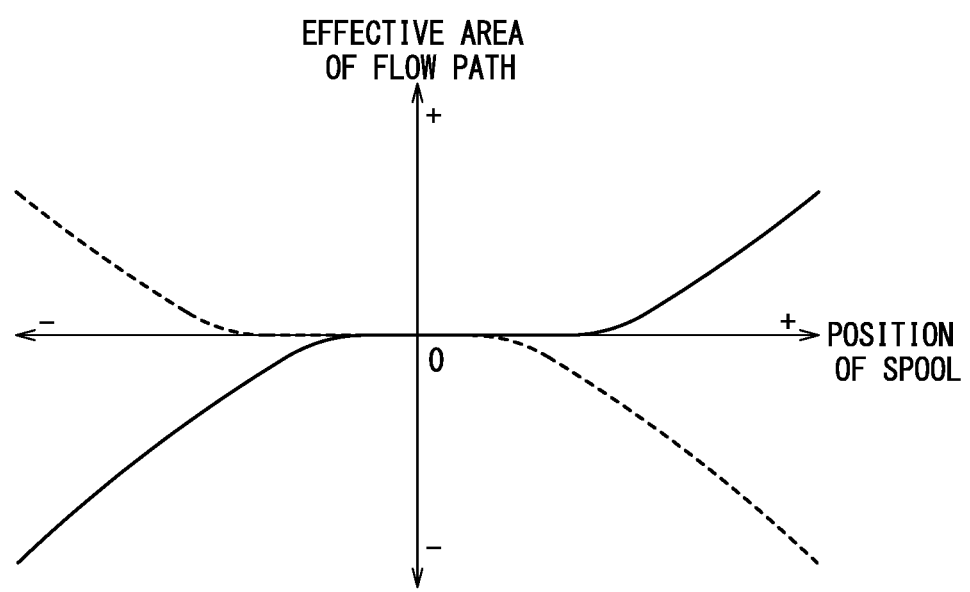
FIG. 9 is a diagram showing the relation between the position of the spool of the servo valve in FIG. 2 and the effective area of the flow path in a case where meter-in control is performed.

FIG. 9 shows the relation between the position of the spool 28 and the effective area of the flow path including the second port 20b and the relation between the position of the spool 28 and the effective area of the flow path including the fourth port 20d in the case where the meter-in control is performed. The former is shown by a solid line, and the latter is shown by a dashed line.

As can be understood from FIG. 9, when the spool 28 has been displaced from the neutral position in the X1 direction by the predetermined amount or more, the effective area of the flow path where the fluid is supplied to the other pressure chamber 36b through the fourth port 20d is smaller than the effective area of the flow path where the fluid in the one pressure chamber 36a is discharged through the second port 20b. Moreover, when the spool 28 has been displaced from the neutral position in the X2 direction by the predetermined amount or more, the effective area of the flow path where the fluid is supplied to the one pressure chamber 36a through the second port 20b is smaller than the effective area of the flow path where the fluid in the other pressure chamber 36b is discharged through the fourth port 20d.

The position of the spool 28 is controlled by the valve controller 68. To the valve controller 68, a command signal regarding a target position of the spool 28 is input from an upper-level controller (PLC or the like) that is not shown, and a detection signal regarding the current position of the spool 28 is also input from the magnetic sensor 53. On the basis of these signals, the valve controller 68 outputs a required electric power supply signal to the exciting coil 50 so as to displace the spool 28 to the target position.

The target position of the spool 28 can be set to any position (steplessly), and can be set to a plurality of predetermined positions other than the neutral position. Examples of the predetermined positions include two predetermined positions respectively in the X1 direction and the X2 direction, and four positions including two predetermined positions in the X1 direction and two predetermined positions in the X2 direction. If the target positions include a plurality of positions in the X1 direction and a plurality of positions in the X2 direction, the operation speed of the fluid pressure cylinder 36 in both ways of the reciprocal motion can be adjusted step by step. These target positions can be set in the valve controller 68 in advance. If the number of settings of the target position is small, the command signal from the upper-level controller can be simplified, for example, combination of binary signals (ON/OFF signals).

In the servo valve 10 according to the present embodiment, each lap length between the land and the inner wall surface of the sleeve 22 that lies between the two adjacent openings when the spool 28 is at the neutral position is set ingeniously. Thus, the meter-out control or the meter-in control can be performed by the servo valve 10 alone.

Second Embodiment

Next, a servo valve according to a second embodiment of the present invention is described with reference to FIG. 10. In the second embodiment, the shape of the spool is different from that in the first embodiment. Note that the constituent elements other than the sleeve and the spool are described using the constituent elements of the servo valve 10 according to the first embodiment and the reference symbols thereof as appropriate.

A cylindrical spool 74 is provided with a first land 76a, a second land 76b, and a third land 76c that are in close contact with the inside of a sleeve 70. The first to third lands 76a to 76c are arranged in the X direction. Between the first land 76a and the second land 76b, a first groove 78a is formed so as to surround the outer peripheral surface. Similarly, between the second land 76b and the third land 76c, a second groove 78b is formed so as to surround the outer peripheral surface.

A first opening 72a, a second opening 72b, a third opening 72c, a fourth opening 72d, and a fifth opening 72e of the sleeve 70 communicate with the first port 20a to the fifth port 20e of the valve body 16, respectively. The shape of the first opening 72a to the fifth opening 72e when viewed in the radial direction is the same rectangular shape, and the width thereof is constant in the X direction.

Figure 10:
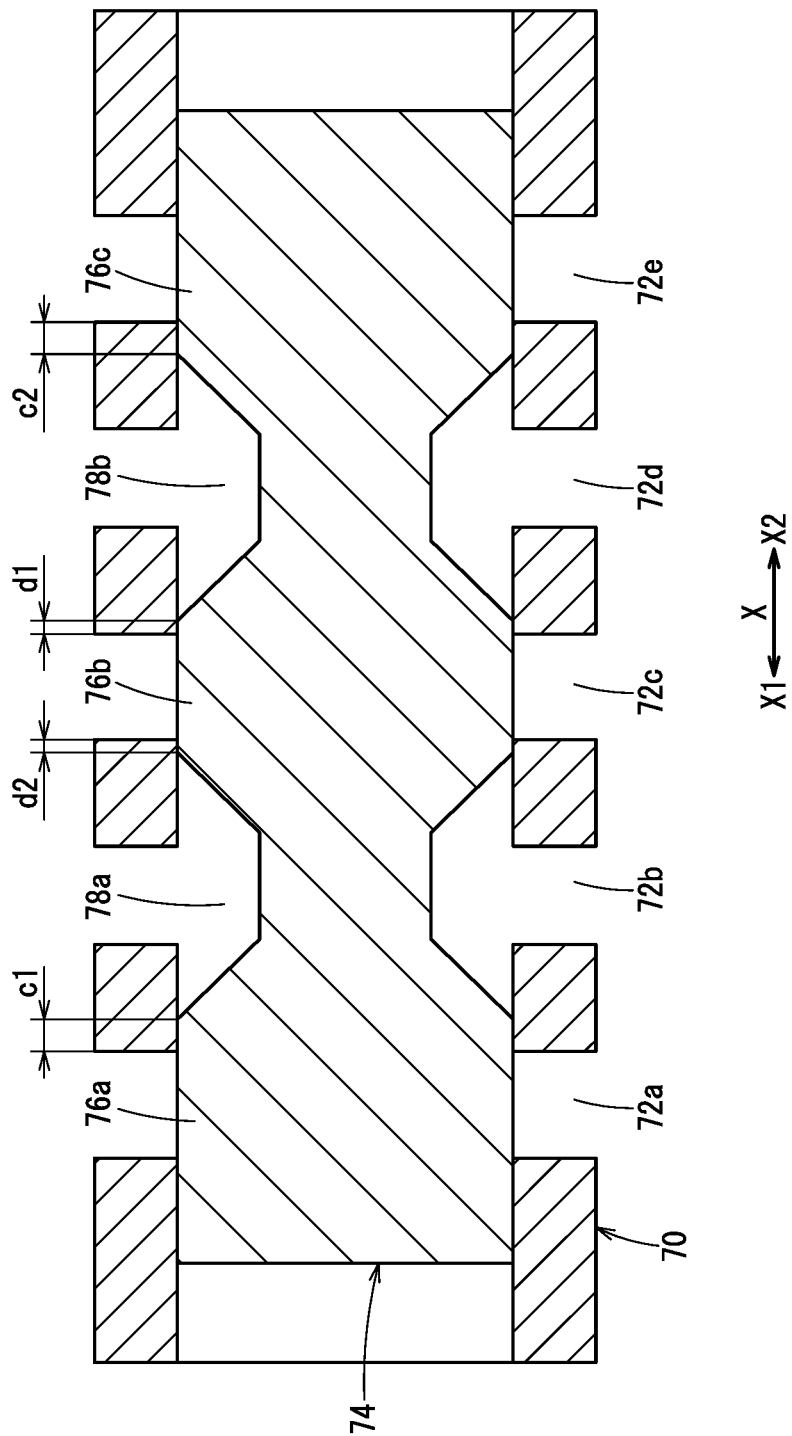
FIG. 10 is a schematic diagram illustrating a relation between a sleeve and a spool of a servo valve according to a second embodiment of the present invention when the spool is at the neutral position.

As illustrated in FIG. 10, when the actuator unit 14 is not energized and the spool 74 is at the neutral position, the first opening 72a of the sleeve 70 is closed by the first land 76a of the spool 74. Similarly, the third opening 72c of the sleeve 70 is closed by the second land 76b of the spool 74, and the fifth opening 72e of the sleeve 70 is closed by the third land 76c of the spool 74. Thus, the second opening 72b connected to the one pressure chamber 36a of the fluid pressure cylinder 36 is blocked from the first opening 72a connected to the fluid supply source and is also blocked from the third opening 72c connected to the fluid discharge port. In addition, the fourth opening 72d connected to the other pressure chamber 36b of the fluid pressure cylinder 36 is blocked from the fifth opening 72e connected to the fluid supply source and is also blocked from the third opening 72c connected to the fluid discharge port.

When the spool 74 is at the neutral position, a lap length d1 is less than a lap length c1. The lap length d1 is a length, in the X direction, of a portion where the second land 76b is in contact with an inner wall surface of the sleeve 70 that lies between the third opening 72c and the fourth opening 72d. The lap length c1 is a length, in the X direction, of a portion where the first land 76a is in contact with an inner wall surface of the sleeve 70 that lies between the first opening 72a and the second opening 72b. In addition, when the spool 74 is at the neutral position, a lap length d2 is less than a lap length c2. The lap length d2 is a length, in the X direction, of a portion where the second land 76b is in contact with an inner wall surface of the sleeve 70 that lies between the second opening 72b and the third opening 72c. The lap length c2 is a length, in the X direction, of a portion where the third land 76c is in contact with an inner wall surface of the sleeve 70 that lies between the fourth opening 72d and the fifth opening 72e. In the present embodiment, the lap length c2 is equal to the lap length c1, and the lap length d2 is equal to the lap length d1.

As the spool 74 is displaced in the X1 direction from the neutral position, the following occurs. First, when the displaced amount of the spool 74 reaches d1, the closed state of the third opening 72c of the sleeve 70 by the second land 76b of the spool 74 is canceled, and the third opening 72c of the sleeve 70 starts to overlap with the second groove 78b of the spool 74. Next, when the displaced amount of the spool 74 reaches c1, the closed state of the first opening 72a of the sleeve 70 by the first land 76a of the spool 74 is canceled, and the first opening 72a of the sleeve 70 starts to overlap with the first groove 78a of the spool 74.

When the third opening 72c of the sleeve 70 overlaps with the second groove 78b of the spool 74, the fourth port 20d connected to the other pressure chamber 36b of the fluid pressure cylinder 36 communicates with the third port 20c connected to the fluid discharge port. In addition, when the first opening 72a of the sleeve 70 overlaps with the first groove 78a of the spool 74, the second port 20b connected to the one pressure chamber 36a of the fluid pressure cylinder 36 communicates with the first port 20a connected to the fluid supply source.

In this case, the length, in the X direction, of an overlapped portion where the first opening 72a overlaps with the first groove 78a is less than the length, in the X direction, of an overlapped portion where the third opening 72c overlaps with the second groove 78b (not shown). Therefore, the effective area of the flow path from the fluid supply source to the one pressure chamber 36a is smaller than the effective area of the flow path from the other pressure chamber 36b to the fluid discharge port. Thus, when the fluid is supplied to the one pressure chamber 36a and the fluid is discharged from the other pressure chamber 36b, the meter-in control that reduces the flow rate of the fluid to be supplied is performed.

As the spool 74 is displaced in the X2 direction from the neutral position, the following occurs. First, when the displaced amount of the spool 74 reaches d2, the closed state of the third opening 72c of the sleeve 70 by the second land 76b of the spool 74 is canceled and the third opening 72c of the sleeve 70 starts to overlap with the first groove 78a of the spool 74. Next, when the displaced amount of the spool 74 reaches c2, the closed state of the fifth opening 72e of the sleeve 70 by the third land 76c of the spool 74 is canceled and the fifth opening 72e of the sleeve 70 starts to overlap with the second groove 78b of the spool 74.

When the third opening 72c of the sleeve 70 overlaps with the first groove 78a of the spool 74, the second port 20b connected to the one pressure chamber 36a of the fluid pressure cylinder 36 communicates with the third port 20c connected to the fluid discharge port. In addition, when the fifth opening 72e of the sleeve 70 overlaps with the second groove 78b of the spool 74, the fourth port 20d connected to the other pressure chamber 36b of the fluid pressure cylinder 36 communicates with the fifth port 20e connected to the fluid supply source.

In this case, the length, in the X direction, of an overlapped portion where the fifth opening 72e overlaps with the second groove 78b is less than the length, in the X direction, of an overlapped portion where the third opening 72c overlaps with the first groove 78a (not shown). Therefore, the effective area of the flow path from the fluid supply source to the other pressure chamber 36b is smaller than the effective area of the flow path from the one pressure chamber 36a to the fluid discharge port. Thus, when the fluid is supplied to the other pressure chamber 36b and the fluid is discharged from the one pressure chamber 36a, the meter-in control that reduces the flow rate of the fluid to be supplied is performed.

In the present embodiment, when the spool 74 is at the neutral position, the magnitude relationship is set such that the lap length d1 is less than the lap length c1 and the lap length d2 is less than the lap length c2. On the other hand, when the meter-out control is to be performed, it is only necessary to set this magnitude relationship in reverse. Moreover, in the present embodiment, the fluid supply source is connected to the first port 20a and the fifth port 20e and the fluid discharge port is connected to the third port 20c. However, if the fluid supply source is connected to the third port 20c and the fluid discharge port is connected to the first port 20a and the fifth port 20e, the meter-out control can be performed.

In the servo valve according to the present embodiment, the lap length of a portion where the land is in contact with an inner wall surface of the sleeve 70 that lies between the two adjacent openings when the spool 74 is at the neutral position is set ingeniously. Thus, the meter-out control or the meter-in control can be performed by the servo valve alone.

Third Embodiment

Next, a servo valve according to a third embodiment of the present invention is described with reference to FIG. 11 to FIG. 13. In the third embodiment, the relation of the lap lengths at the neutral position and the shapes of the openings of the sleeve are different from those in the first embodiment. Note that the constituent elements other than the sleeve and the spool are described using the constituent elements of the servo valve 10 according to the first embodiment and the reference symbols thereof as appropriate.

Figure 11:
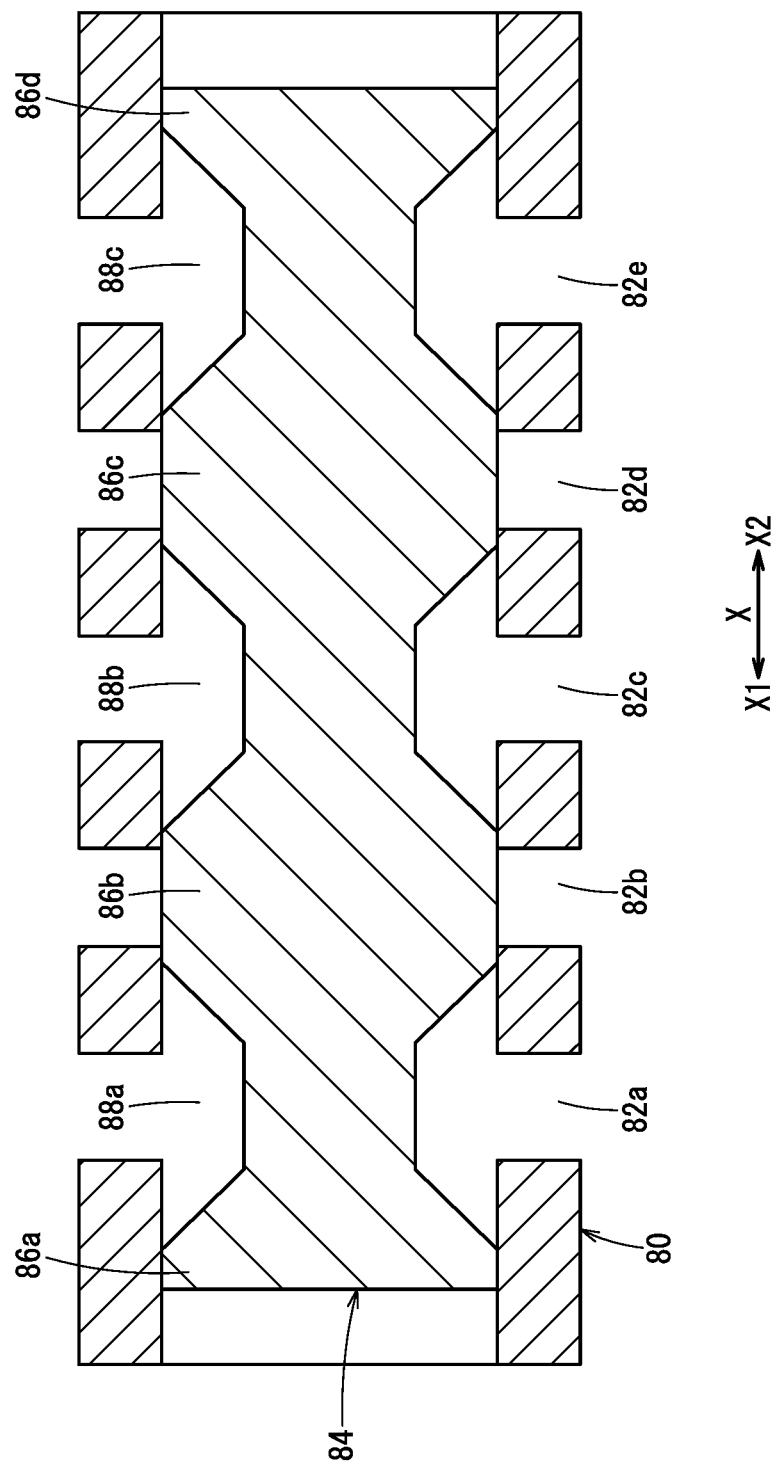
FIG. 11 is a schematic diagram illustrating a relation between a sleeve and a spool of a servo valve according to a third embodiment of the present invention when the spool is at the neutral position.

As illustrated in FIG. 11, when a spool 84 is at the neutral position, a second opening 82b of a sleeve 80 is closed by a second land 86b of the spool 84, and a fourth opening 82d of the sleeve 80 is closed by a third land 86c of the spool 84.

When the spool 84 is at the neutral position, the lap length of a portion where the second land 86b is in contact with an inner wall surface of the sleeve 80 that lies between a first opening 82a and the second opening 82b is equal to the lap length of a portion where the third land 86c is in contact with an inner wall surface of the sleeve 80 that lies between the third opening 82c and the fourth opening 82d. In addition, when the spool 84 is at the neutral position, the lap length of a portion where the third land 86c is in contact with an inner wall surface of the sleeve 80 that lies between the fourth opening 82d and a fifth opening 82e is equal to the lap length of a portion where the second land 86b is in contact with an inner wall surface of the sleeve 80 that lies between the second opening 82b and the third opening 82c.

The shape of the second opening 82b when viewed in the radial direction is a triangular shape having a base positioned on the side of an end in the X1 direction and a vertex opposed to the base being positioned on the side of an end in the X2 direction. The shape of the fourth opening 82d when viewed in the radial direction is a triangular shape having a base positioned on the side of the end in the X2 direction and a vertex opposed to the base being positioned on the side of the end in the X1 direction. The shape of the fourth opening 82d is obtained by inversing the shape of the second opening 82b in the X direction.

On the other hand, the shape of the first opening 82a, the third opening 82c, and the fifth opening 82e when viewed in the radial direction is the same rectangular shape, and the width thereof is constant in the X direction and is substantially the same as the length of the base of the above triangle corresponding to the maximum width of the second opening 82b and the fourth opening 82d. In the present embodiment, the second opening 82b and the fourth opening 82d have a triangular shape. However, it is only necessary that the shape of each of the second opening 82b and the fourth opening 82d is asymmetric in the X1 direction and the X2 direction and the shape of the second opening 82b is obtained by inversing the shape of the fourth opening 82d in the X direction. Moreover, it is preferable that the shape with the width gradually increasing in the X1 direction and the shape with the width gradually increasing in the X2 direction are paired.

The operation of the servo valve according to the third embodiment is hereinafter described on the premise that the first opening 82a is connected to the fluid supply source, the second opening 82b is connected to the one pressure chamber 36a of the fluid pressure cylinder 36, the third opening 82c is connected to the fluid discharge port, the fourth opening 82d is connected to the other pressure chamber 36b of the fluid pressure cylinder 36, and the fifth opening 82e is connected to the fluid supply source.

Figure 12:
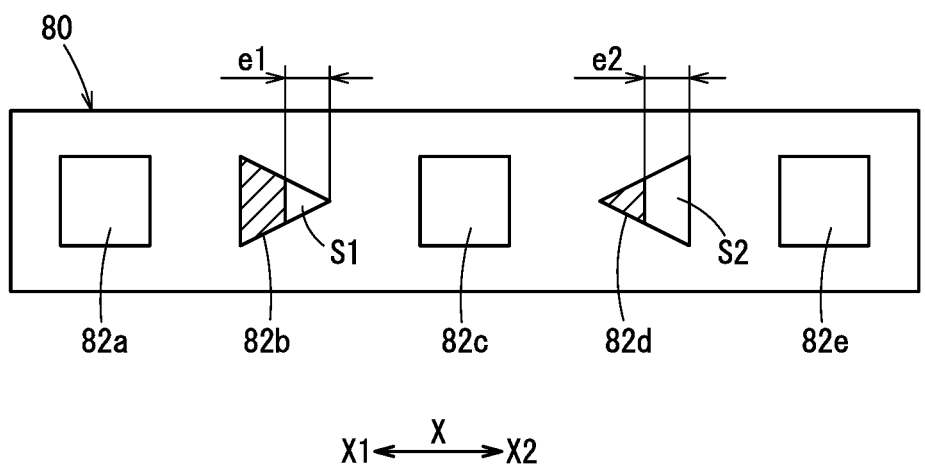
FIG. 12 is a diagram illustrating a state of openings formed in the sleeve when the spool in FIG. 11 has been displaced in the X1 direction.

As illustrated in FIG. 12, when the spool 84 has been displaced in the X1 direction by the predetermined amount or more, an X-direction length e1 is equal to an X-direction length e2. The X-direction length e1 is a length, in the X direction, of a portion where the second opening 82b of the sleeve 80 overlaps with a second groove 88b of the spool 84. The X-direction length e2 is a length, in the X direction, of a portion where the fourth opening 82d of the sleeve 80 overlaps with a third groove 88c of the spool 84. However, an area S1 of a portion where the second opening 82b overlaps with the second groove 88b on the vertex side of the triangle is smaller than an area S2 of a portion where the fourth opening 82d overlaps with the third groove 88c on the base side of the triangle. Therefore, the effective area of the flow path from the one pressure chamber 36a to the fluid discharge port is smaller than the effective area of the flow path from the fluid supply source to the other pressure chamber 36b, so that the meter-out control is performed.

Figure 13:
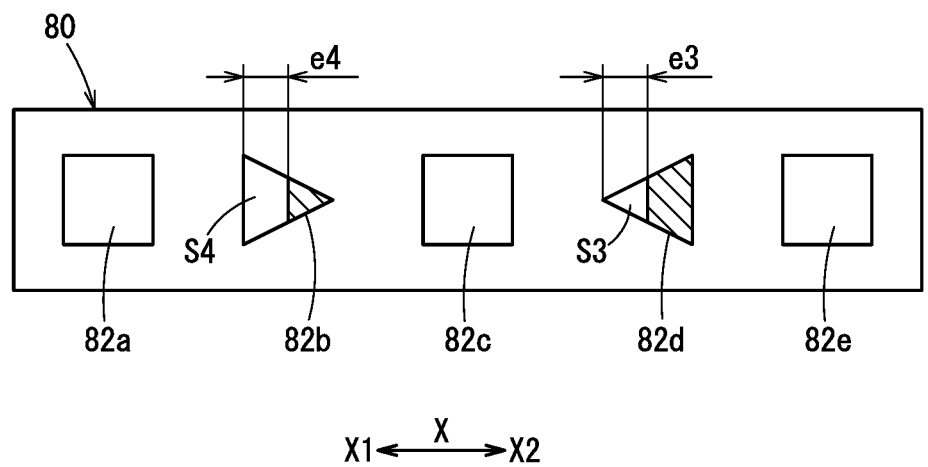
FIG. 13 is a diagram illustrating the state of the openings formed in the sleeve when the spool in FIG. 11 has been displaced in the X2 direction.

As illustrated in FIG. 13, when the spool 84 has been displaced in the X2 direction by the predetermined amount or more, an X-direction length e3 is equal to an X-direction length e4. The X-direction length e3 is a length, in the X direction, of a portion where the fourth opening 82d of the sleeve 80 overlaps with the second groove 88b of the spool 84. The X-direction length e4 is a length, in the X direction, of a portion where the second opening 82b of the sleeve 80 overlaps with a first groove 88a of the spool 84. However, an area S3 of a portion where the fourth opening 82d overlaps with the second groove 88b on the vertex side of the triangle is smaller than an area S4 of a portion where the second opening 82b overlaps with the first groove 88a on the base side of the triangle. Therefore, the effective area of the flow path from the other pressure chamber 36b to the fluid discharge port is smaller than the effective area of the flow path from the fluid supply source to the one pressure chamber 36a, so that the meter-out control is performed. Note that in FIG. 12 and FIG. 13, hatched areas of the second opening 82b and the fourth opening 82d indicate a state where these areas are closed by the spool 84.

Here, the maximum displaced amount of the spool 84 in the X1 direction is set within a range in which the entire second opening 82b overlaps with the second groove 88b and the entire fourth opening 82d does not overlap with the third groove 88c. This is because the effective area of the flow path from the one pressure chamber 36a to the fluid discharge port is equal to the effective area of the flow path from the fluid supply source to the other pressure chamber 36b in the case that the entire fourth opening also overlaps with the third groove. Similarly, the maximum displaced amount of the spool 84 in the X2 direction is set within a range in which the entire second opening 82b overlaps with the first groove 88a and the entire fourth opening 82d does not overlap with the second groove 88b.

In the present embodiment, the second opening 82b has a triangular shape having the base positioned on the side of the end in the X1 direction and the fourth opening 82d has a triangular shape having the base positioned on the side of the end in the X2 direction. However, if the second opening 82b has a triangular shape having the base positioned on the side of the end in the X2 direction and the fourth opening 82d has a triangular shape having the base positioned on the side of the end in the X1 direction, the meter-in control can be performed.

In addition, in the present embodiment, the fluid supply source is connected to the first port 20a and the fifth port 20e and the fluid discharge port is connected to the third port 20c. However, if the fluid supply source is connected to the third port 20c and the fluid discharge port is connected to the first port 20a and the fifth port 20e, the meter-in control can be performed.

In the servo valve according to the present embodiment, the shapes of the openings of the sleeve 80 are formed ingeniously. Thus, the meter-out control or the meter-in control can be performed by the servo valve alone.

Fourth Embodiment

Next, a servo valve according to a fourth embodiment of the present invention is described with reference to FIG. 14 to FIG. 16. In the fourth embodiment, the relationship of the lap lengths at the neutral position and the shapes of the openings of the sleeve are different from those in the second embodiment. Note that the constituent elements other than the sleeve and the spool are described using the constituent elements of the servo valve 10 according to the first embodiment and the reference symbols thereof as appropriate.

Figure 14:
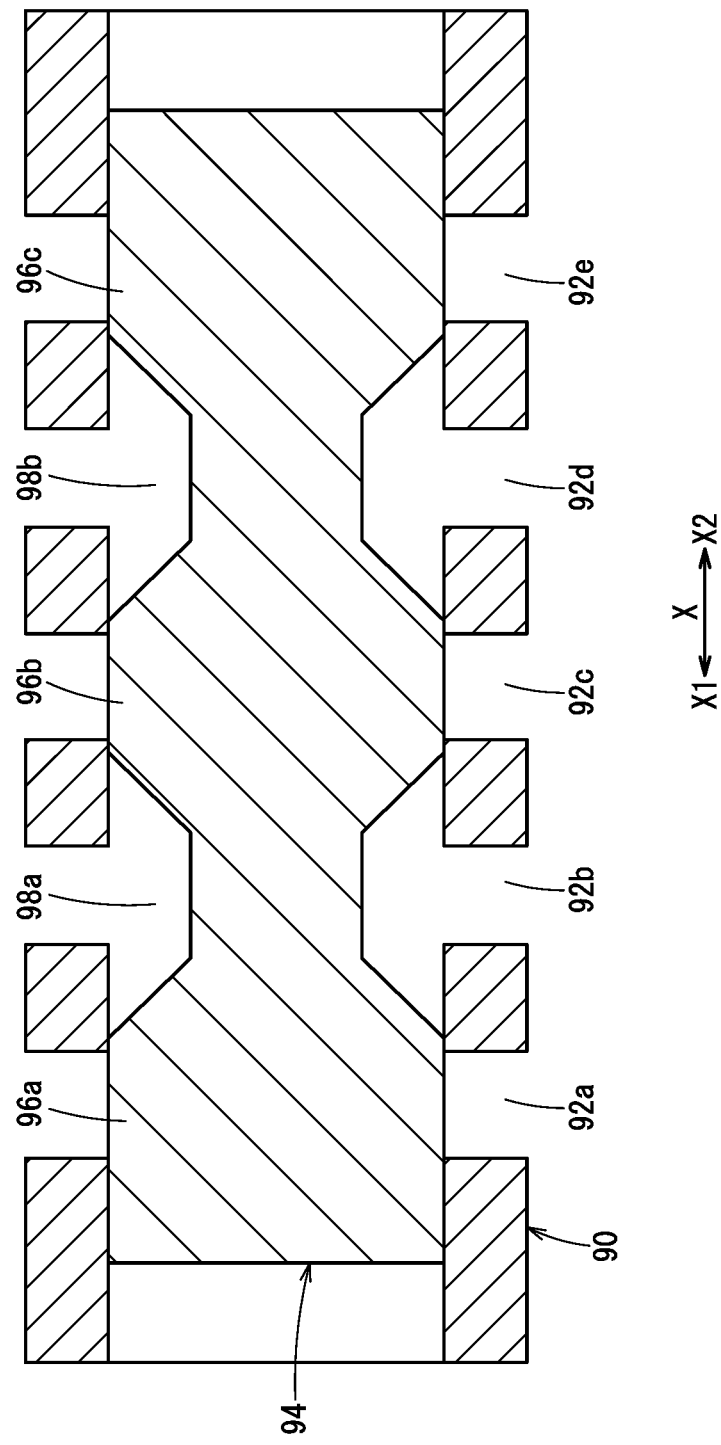
FIG. 14 is a schematic diagram illustrating a relation between a sleeve and a spool of a servo valve according to a fourth embodiment of the present invention when the spool is at the neutral position.

As illustrated in FIG. 14, when a spool 94 is at the neutral position, a first opening 92a, a third opening 92c, and a fifth opening 92e of a sleeve 90 are closed by a first land 96a, a second land 96b, and a third land 96c of the spool 94, respectively.

When the spool 94 is at the neutral position, the lap length of a portion where the second land 96b is in contact with an inner wall surface of the sleeve 90 that lies between the third opening 92c and a fourth opening 92d is equal to the lap length of a portion where the first land 96a is in contact with an inner wall surface of the sleeve 90 that lies between the first opening 92a and a second opening 92b. In addition, when the spool 94 is at the neutral position, the lap length of a portion where the second land 96b is in contact with an inner wall surface of the sleeve 90 that lies between the second opening 92b and the third opening 92c is equal to the lap length of a portion where the third land 96c is in contact with an inner wall surface of the sleeve 90 that lies between the fourth opening 92d and the fifth opening 92e.

The shape of the first opening 92a when viewed in the radial direction is a triangular shape having a base positioned on the side of an end in the X1 direction and a vertex opposed to the base being positioned on the side of an end in the X2 direction. The shape of the fifth opening 92e when viewed in the radial direction is a triangular shape having a base positioned on the side of the end in the X2 direction and a vertex opposed to the base being positioned on the side of the end in the X1 direction. The shape of the fifth opening 92e is obtained by inversing the shape of the first opening 92a in the X direction.

On the other hand, the shape of the second opening 92b, the third opening 92c, and the fourth opening 92d when viewed in the radial direction is the same rectangular shape, and the width thereof is constant in the X direction and is substantially the same as the length of the base of the above triangle corresponding to the maximum width of the first opening 92a and the fifth opening 92e. In the present embodiment, the first opening 92a and the fifth opening 92e have a triangular shape. However, it is only necessary that the shape of each of the first opening 92a and the fifth opening 92e is asymmetric in the X1 direction and the X2 direction and the shape of the first opening 92a is obtained by inversing the shape of the fifth opening 92e in the X direction. Alternatively, it is only necessary that the shape of each of the first opening 92a and the fifth opening 92e is the same shape that is symmetric in the X1 direction and the X2 direction. Note that it is necessary that the width of the first opening 92a and the width of the fifth opening 92e are within the range of the width of the third opening 92c.

The operation of the servo valve according to the fourth embodiment is hereinafter described on the premise that the first opening 92a is connected to the fluid discharge port, the second opening 92b is connected to the one pressure chamber 36a of the fluid pressure cylinder 36, the third opening 92c is connected to the fluid supply source, the fourth opening 92d is connected to the other pressure chamber 36b of the fluid pressure cylinder 36, and the fifth opening 92e is connected to the fluid discharge port.

Figure 15:
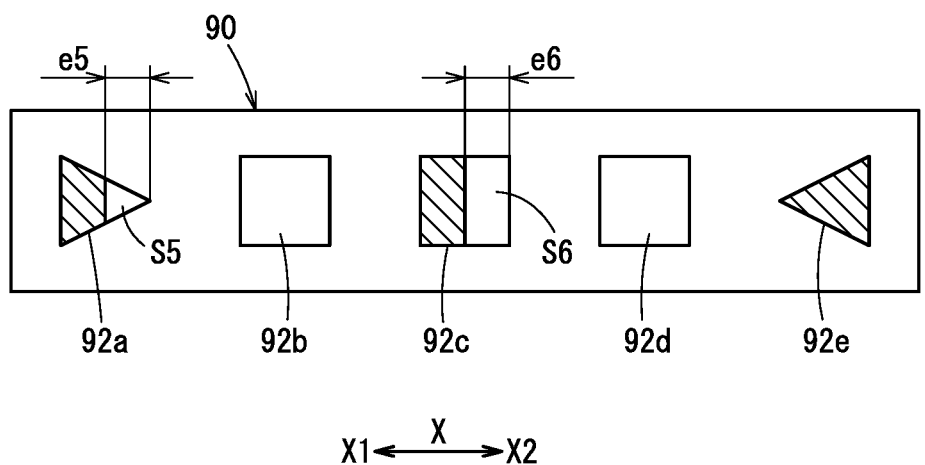
FIG. 15 is a diagram illustrating a state of openings formed in the sleeve when the spool in FIG. 14 has been displaced in the X1 direction.

As illustrated in FIG. 15, when the spool 94 has been displaced in the X1 direction by the predetermined amount or more, an X-direction length e5 is equal to an X-direction length e6. The X-direction length e5 is a length, in the X direction, of a portion where the first opening 92a of the sleeve 90 overlaps with a first groove 98a of the spool 94. The X-direction length e6 is a length, in the X direction, of a portion where the third opening 92c of the sleeve 90 overlaps with a second groove 98b of the spool 94. However, an area S5 of a portion where the first opening 92a overlaps with the first groove 98a on the vertex side of the triangle is smaller than an area S6 of a portion where the third opening 92c having the constant width overlaps with the second groove 98b. Therefore, the effective area of the flow path from the one pressure chamber 36a to the fluid discharge port is smaller than the effective area of the flow path from the fluid supply source to the other pressure chamber 36b, so that the meter-out control is performed.

Figure 16:
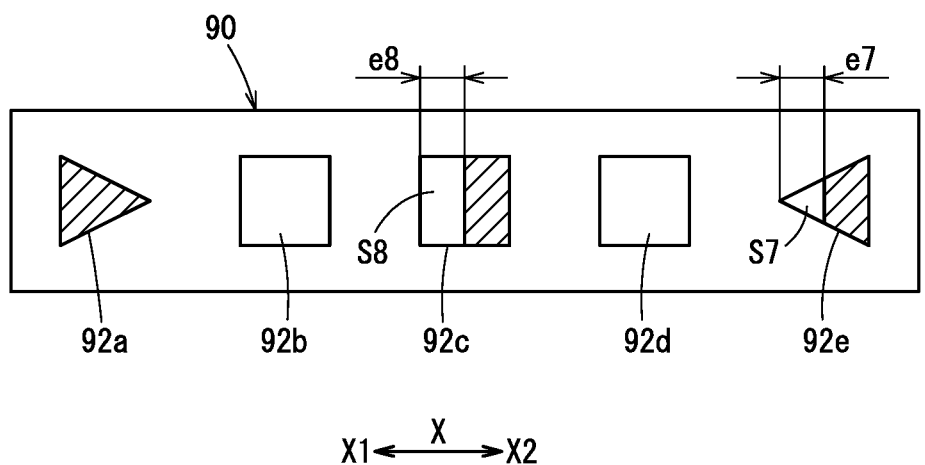
FIG. 16 is a diagram illustrating the state of the openings formed in the sleeve when the spool in FIG. 14 has been displaced in the X2 direction.

As illustrated in FIG. 16, when the spool 94 has been displaced in the X2 direction by the predetermined amount or more, an X-direction length e7 is equal to an X-direction length e8. The X-direction length e7 is a length, in the X direction, of a portion where the fifth opening 92e of the sleeve 90 overlaps with the second groove 98b of the spool 94. The X-direction length e8 is a length, in the X direction, of a portion where the third opening 92c of the sleeve 90 overlaps with the first groove 98a of the spool 94. However, an area S7 of a portion where the fifth opening 92e overlaps with the second groove 98b on the vertex side of the triangle is smaller than an area S8 where the third opening 92c having the constant width overlaps with the first groove 98a. Therefore, the effective area of the flow path from the other pressure chamber 36b to the fluid discharge port is smaller than the effective area of the flow path from the fluid supply source to the one pressure chamber 36a, so that the meter-out control is performed. Note that in FIG. 15 and FIG. 16, hatched areas of the first opening 92a, the third opening 92c, and the fifth opening 92e indicate a state where these areas are closed by the spool 94.

In the present embodiment, the first opening 92a has a triangular shape in which the base is positioned on the side of the end in the X1 direction, and the fifth opening 92e has a triangular shape in which the base is positioned on the side of the end in the X2 direction. However, if the first opening 92a has a triangular shape in which the base is positioned on the side of the end in the X2 direction and the fifth opening 92e has a triangular shape in which the base is positioned on the side of the end in the X1 direction, the meter-in control can be performed.

In addition, in the present embodiment, the fluid supply source is connected to the third port 20c and the fluid discharge port is connected to the first port 20a and the fifth port 20e. However, if the fluid supply source is connected to the first port 20a and the fifth port 20e and the fluid discharge port is connected to the third port 20c, the meter-in control can be performed.

In the servo valve according to the present embodiment, the shapes of the openings of the sleeve 90 are formed ingeniously. Thus, the meter-out control or the meter-in control can be performed by the servo valve alone.

Fifth Embodiment

Next, a servo valve according to a fifth embodiment of the present invention is described with reference to FIG. 17 to FIG. 19. In the fifth embodiment, the relation of the lap lengths at the neutral position and the shapes of the openings of the sleeve are different from those in the second embodiment. Note that the constituent elements other than the sleeve and the spool are described using the constituent elements of the servo valve 10 according to the first embodiment and the reference symbols thereof as appropriate.

Figure 17:
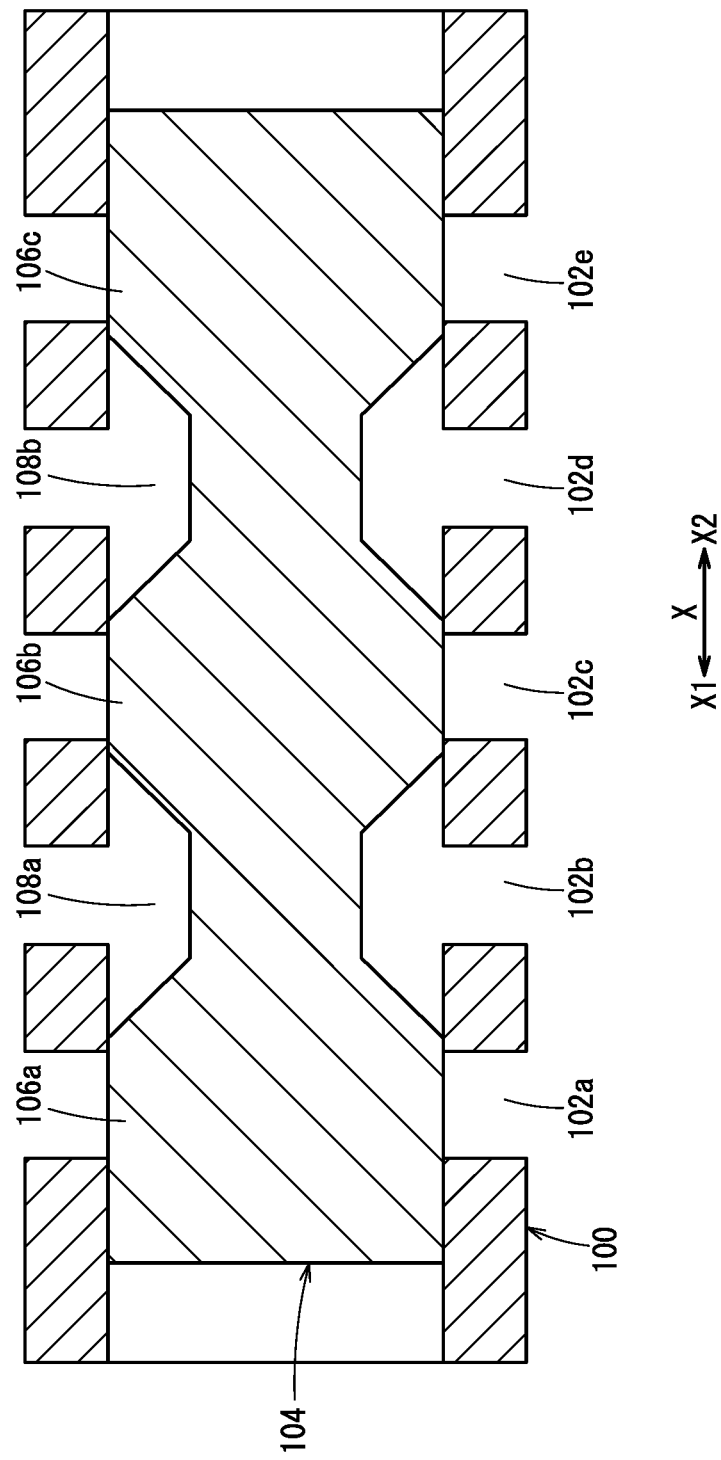
FIG. 17 is a schematic diagram illustrating a relation between a sleeve and a spool of a servo valve according to a fifth embodiment of the present invention when the spool is at the neutral position.

As illustrated in FIG. 17, when a spool 104 is at the neutral position, a first opening 102a, a third opening 102c, and a fifth opening 102e of a sleeve 100 are closed by a first land 106a, a second land 106b, and a third land 106c of the spool 104, respectively.

When the spool 104 is at the neutral position, the lap length of a portion where the second land 106b is in contact with an inner wall surface of the sleeve 100 that lies between the third opening 102c and a fourth opening 102d is equal to the lap length of a portion where the first land 106a is in contact with an inner wall surface of the sleeve 100 that lies between the first opening 102a and a second opening 102b. In addition, when the spool 104 is at the neutral position, the lap length of a portion where the second land 106b is in contact with an inner wall surface of the sleeve 100 that lies between the second opening 102b and the third opening 102c is equal to the lap length of a portion where the third land 106c is in contact with an inner wall surface of the sleeve 100 that lies between the fourth opening 102d and the fifth opening 102e.

The shape of the third opening 102c when viewed in the radial direction is a rhombic shape that is symmetric in the X1 direction and the X2 direction, that is, a rhombic shape with one of the diagonal lines being oriented in the X direction. On the other hand, the shape of the first opening 102a, the second opening 102b, the fourth opening 102d, and the fifth opening 102e when viewed in the radial direction is the same rectangular shape, and the width thereof is constant in the X direction and is substantially the same as the length of the other diagonal line of the rhombic shape corresponding to the maximum width of the third opening 102c. In the present embodiment, the third opening 102c has a rhombic shape. However, as long as the shape thereof is symmetric in the X1 direction and the X2 direction and the width thereof is within the range of the width of the first opening 102a and the fifth opening 102e with a rectangular shape, any shape may be employed.

The operation of the servo valve according to the fifth embodiment is hereinafter described on the premise that the first opening 102a is connected to the fluid supply source, the second opening 102b is connected to the one pressure chamber 36a of the fluid pressure cylinder 36, the third opening 102c is connected to the fluid discharge port, the fourth opening 102d is connected to the other pressure chamber 36b of the fluid pressure cylinder 36, and the fifth opening 102e is connected to the fluid supply source.

Figure 18:
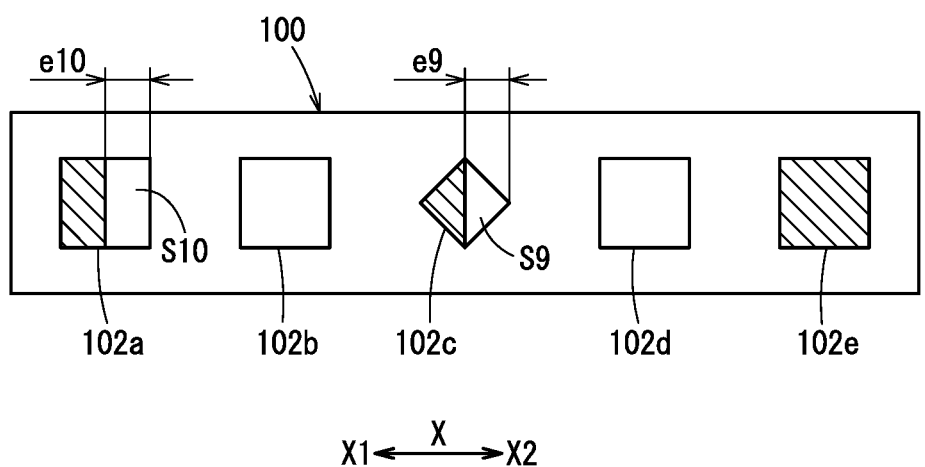
FIG. 18 is a diagram illustrating a state of openings formed in the sleeve when the spool in FIG. 17 has been displaced in the X1 direction.

As illustrated in FIG. 18, when the spool 104 has been displaced in the X1 direction by the predetermined amount or more, an X-direction length e9 is equal to an X-direction length e10. The X-direction length e9 is a length, in the X direction, of a portion where the third opening 102c of the sleeve 100 overlaps with a second groove 108b of the spool 104. The X-direction length e10 is a length, in the X direction, of a portion where the first opening 102a of the sleeve 100 overlaps with a first groove 108a of the spool 104. However, an area S9 of a portion where the third opening 102c overlaps with the second groove 108b on a vertex side of the rhombus in the X2 direction is smaller than an area S10 of a portion where the first opening 102a having the constant width overlaps with the first groove 108a. Therefore, the effective area of the flow path from the other pressure chamber 36b to the fluid discharge port is smaller than the effective area of the flow path from the fluid supply source to the one pressure chamber 36a, so that the meter-out control is performed.

Figure 19:
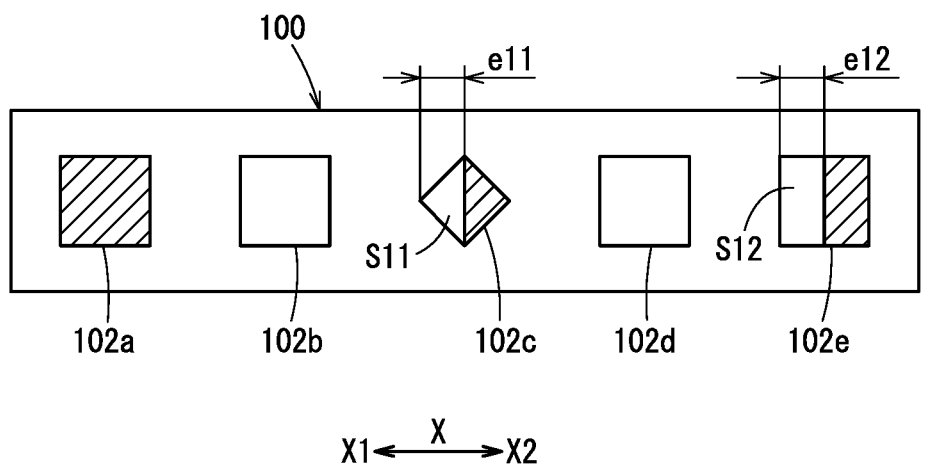
FIG. 19 is a diagram illustrating the state of the openings formed in the sleeve when the spool in FIG. 17 has been displaced in the X2 direction.

As illustrated in FIG. 19, when the spool 104 has been displaced in the X2 direction by the predetermined amount or more, an X-direction length e11 is equal to an X-direction length e12. The X-direction length e11 is a length, in the X direction, of a portion where the third opening 102c of the sleeve 100 overlaps with the first groove 108a of the spool 104. The X-direction length e12 is a length, in the X direction, of a portion where the fifth opening 102e of the sleeve 100 overlaps with the second groove 108b of the spool 104. However, an area S11 of a portion where the third opening 102c overlaps with the first groove 108a on the vertex side in the X1 direction of the rhombus is smaller than an area S12 of a portion where the fifth opening 102e with the constant width overlaps with the second groove 108b. Therefore, the effective area of the flow path from the one pressure chamber 36a to the fluid discharge port is smaller than the effective area of the flow path from the fluid supply source to the other pressure chamber 36b, so that the meter-out control is performed. Note that in FIG. 18 and FIG. 19, hatched areas of the first opening 102a, the third opening 102c, and the fifth opening 102e indicate a state where these areas are closed by the spool 104.

In the present embodiment, the fluid supply source is connected to the first port 20a and the fifth port 20e and the fluid discharge port is connected to the third port 20c. However, if the fluid supply source is connected to the third port 20c and the fluid discharge port is connected to the first port 20a and the fifth port 20e, the meter-in control can be performed.

In the servo valve according to the present embodiment, the shapes of the openings of the sleeve 100 are formed ingeniously. Thus, the meter-out control or the meter-in control can be performed by the servo valve alone.

The servo valve according to the present invention is not limited to the above embodiments, and can employ various structures without departing from the gist and essence of the present invention.

What is claimed is:

1. A servo valve configured to control a flow rate of a fluid supplied to and discharged from a first pressure chamber and a second pressure chamber of a fluid pressure cylinder, the servo valve comprising:
   a sleeve including a plurality of openings; and
   a spool that is provided inside the sleeve,
   wherein the spool includes a plurality of lands and a plurality of grooves, and a first flow path area is present at a place where one opening of the plurality of openings and one groove of the plurality of grooves overlap with each other and a second flow path area is present at a place where another opening of the plurality of openings and another groove of the plurality of grooves overlap with each other, wherein the one opening and the one groove form a flow path for connecting one of the first pressure chamber and the second pressure chamber to a fluid supply source, due to displacement of the spool from a neutral position, and the other opening and the other groove form a flow path for connecting another one of the second pressure chamber and the first pressure chamber to a fluid discharge port, due to the displacement of the spool from the neutral position,
   wherein the first flow path area is the minimum flow path area of the flow path for connecting the one of the first pressure chamber and the second chamber to the fluid supply source, and the second flow path area is the minimum flow path area of the flow path for connecting the another one of the second pressure chamber and the pressure chamber to the fluid discharge port, wherein in the neutral position of the spool, the first pressure chamber is not connected to any of the fluid supply source or the fluid discharge port, and the second pressure chamber is not connected to any of the fluid supply source or the fluid discharge port, and wherein the first flow path area is different in size from the second flow path area such that the one opening opens before the other opening due to the displacement of the spool from the neutral position.

2. The servo valve according to claim 1, wherein the second flow path area is smaller than the first flow path area.

3. The servo valve according to claim 1, wherein the first flow path area is smaller than the second flow path area.

4. The servo valve according to claim 1, wherein a difference between the first flow path area and the second flow path area is based on a difference between two predetermined lap lengths among a plurality of lap lengths, each of the lap lengths being a length of a portion where, when the spool is at the neutral position, a first land of the plurality of lands is in contact with an inner wall surface of the sleeve that lies between two adjacent openings of the plurality of openings.

5. The servo valve according to claim 1, wherein a difference between the first flow path area and the second flow path area is based on a shape of the one opening among the plurality of openings having a width that is within a range of a width of the other opening among the plurality of openings.

6. The servo valve according to claim 1, wherein the plurality of openings in the sleeve includes a first opening, a second opening, a third opening, a fourth opening, and a fifth opening, wherein said first through fifth openings include said one opening and said another opening, the first opening and the fifth opening are connected to the fluid supply source, the second opening is connected to the first pressure chamber of the fluid pressure cylinder, the third opening is connected to the fluid discharge port, and the fourth opening is connected to the second ether pressure chamber of the fluid pressure cylinder.

7. The servo valve according to claim 1, wherein the plurality of openings in the sleeve includes a first opening, a second opening, a third opening, a fourth opening, and a fifth opening, wherein said first through fifth openings include said one opening and said another opening, the first opening and the fifth opening are connected to the fluid discharge port, the second opening is connected to the first pressure chamber of the fluid pressure cylinder, the third opening is connected to the fluid supply source, and the fourth opening is connected to the second pressure chamber of the fluid pressure cylinder.

8. The servo valve according to claim 6, wherein the plurality of lands in the spool includes a first land, a second land, a third land, and a fourth land, and when the spool is at the neutral position, the second opening of the sleeve is closed by the second land of e spool and the fourth opening of the sleeve is closed by the third land of the spool.

9. The servo valve according to claim 7, wherein the plurality of lands in the spool includes a first land, a second land, a third land, and a fourth land, and when the spool is at the neutral position, the second opening of the sleeve is closed by the second land of the spool and the fourth opening of the sleeve is closed by the third land of the spool.

10. The servo valve according to claim 6, wherein the plurality of lands in the spool includes a first land, a second land, and a third land, and when the spool is at the neutral position, the first opening of the sleeve is closed by the first land of the spool, the third opening of the sleeve is closed by the second land of the spool, and the fifth opening of the sleeve is closed by the third land of the spool.

11. The servo valve according to claim 7, wherein the plurality of lands in the spool includes a first land, a second land, and a third land, and when the spool is at the neutral position, the first opening of the sleeve is closed by the first land of the spool, the third opening of the sleeve is closed by the second land of the spool, and the fifth opening of the sleeve is closed by the third land of the spool.

12. The servo valve according to claim 1, wherein a target position of the spool is set to a plurality of predetermined positions.

13. A servo valve configured to control a flow rate of a fluid supplied to and discharged from a first pressure chamber and a second pressure chamber of a fluid pressure cylinder, the servo valve comprising:

a sleeve including a plurality of openings; and a spool that is provided inside the sleeve, wherein the spool includes a plurality of lands and a plurality of grooves, and a first flow path area is present at a place where one opening of the plurality of openings and one groove of the plurality of grooves overlap with each other and a second flow path area is present at a place where another opening of the plurality of openings and another groove of the plurality of grooves overlap with each other, wherein the one opening and the one groove form a flow path for connecting one of the first pressure chamber and the second pressure chamber to a fluid supply source, due to displacement of the spool from a neutral position, and the other opening and the other groove form a flow path for connecting another one of the second pressure chamber and the first pressure chamber to a fluid discharge port, due to the displacement of the spool from the neutral position, wherein the first flow path area is the minimum flow path area of the flow path for connecting the one of the first pressure chamber and the second chamber to the fluid supply source and the second flow path area is the minimum flow path area of the flow path for connecting the another one of the second pressure chamber and the first pressure chamber to the fluid discharge port, wherein in the neutral position of the spool, the first pressure chamber is not connected to any of the fluid supply source or the fluid discharge port, and the second pressure chamber is not connected to any of the fluid supply source or the fluid discharge port, and wherein the first flow path area is different in size from the second flow path area, wherein the first flow path area and the second flow path area are asymmetric on both sides in a direction in which the spool moves.

14. The servo valve according to claim 13, wherein a predetermined opening among the plurality of openings has a triangular shape.

* * * * *